United States Patent
Wilson et al.

(10) Patent No.: US 11,663,405 B2
(45) Date of Patent: May 30, 2023

(54) MACHINE LEARNING APPLICATIONS FOR TEMPORALLY-RELATED EVENTS

(71) Applicant: MICROSOFT TECHNOLOGY LICENSING, LLC, Redmond, WA (US)

(72) Inventors: Alexander James Wilson, Dublin (IE); Tom Neckermann, Dublin (IE); Simone Van Bruggen, Utrecht (NL)

(73) Assignee: Microsoft Technology Licensing, LLC, Redmond, WA (US)

( * ) Notice: Subject to any disclaimer, the term of this patent is extended or adjusted under 35 U.S.C. 154(b) by 777 days.

(21) Appl. No.: 16/219,777

(22) Filed: Dec. 13, 2018

(65) Prior Publication Data

US 2020/0193239 A1 Jun. 18, 2020

(51) Int. Cl.
*G06K 9/62* (2022.01)
*G06F 16/38* (2019.01)
(Continued)

(52) U.S. Cl.
CPC ............ *G06F 40/284* (2020.01); *G06F 16/38* (2019.01); *G06F 18/24* (2023.01); *G06F 40/289* (2020.01); *G06N 20/00* (2019.01)

(58) Field of Classification Search
None
See application file for complete search history.

(56) References Cited

U.S. PATENT DOCUMENTS 8,086,441 B1 * 12/2011 Raffill ................... G06F 40/205
704/7
10,594,757 B1 * 3/2020 Shevchenko ........... G06F 40/30
(Continued)

FOREIGN PATENT DOCUMENTS

WO 2019245885 A1 12/2019

OTHER PUBLICATIONS

Bautista, et al., "CliqueCNN: Deep Unsupervised Exemplar Learning", In Proceedings of Annual Conference on Neural Information Processing Systems, Dec. 5, 2016, 09 Pages.
(Continued)

*Primary Examiner* — Ashish Thomas
*Assistant Examiner* — Raheem Hoffler
(74) *Attorney, Agent, or Firm* — NovoTechIP International PLLC

(57) ABSTRACT

Systems and methods for enhanced classification of sequences of objects based on clique similarity and metadata associated with the sequences are presented. Sequences are received. Events are detected based on analyzing k-skip-n-grams included in the sequences. For each event of the detected plurality of events, a graph is generated. The graph for a particular event includes z-cliques that correspond to portions of the k-skip-n-grams that are included in the sequences that are associated with the particular event. A first sequence, which is separate from the other sequences, is received. The first sequence includes a first plurality of k-skip-n-grams. A trained classifier is employed to classify the first sequence as being associated with a first event of the detected events. Classifying the first sequence is based on a comparison between the first plurality of k-skip-n-grams and the z-cliques of the graph that is generated for the first event.

19 Claims, 11 Drawing Sheets

(51) Int. Cl.
*G06N 20/00* (2019.01)
*G06F 40/289* (2020.01)
*G06F 40/284* (2020.01)
*G06F 18/24* (2023.01)

(56) References Cited

U.S. PATENT DOCUMENTS

| | | | | |
|---|---|---|---|---|
| 10,685,293 | B1* | 6/2020 | Heimann | G06N 20/00 |
| 10,942,963 | B1* | 3/2021 | Huang | G06F 16/355 |
| 11,017,778 | B1* | 5/2021 | Thomson | H04M 3/42382 |
| 2010/0138377 | A1* | 6/2010 | Wright | G06F 40/284 |
| | | | | 706/52 |
| 2012/0137367 | A1* | 5/2012 | Dupont | G06F 21/00 |
| | | | | 726/25 |
| 2014/0114978 | A1 | 4/2014 | Chatterjee et al. | |
| 2016/0078361 | A1* | 3/2016 | Brueckner | H04L 67/10 |
| | | | | 706/12 |
| 2017/0193083 | A1 | 7/2017 | Bhatt et al. | |
| 2018/0157644 | A1* | 6/2018 | Mandt | G06N 20/00 |
| 2019/0005024 | A1* | 1/2019 | Somech | G06F 16/24575 |
| 2019/0327331 | A1* | 10/2019 | Natarajan | G06N 20/00 |
| 2019/0392027 | A1 | 12/2019 | Wilson | |
| 2020/0042837 | A1* | 2/2020 | Skinner | G06K 9/6262 |
| 2020/0057612 | A1* | 2/2020 | Doyle | G06F 8/35 |
| 2021/0334309 | A1* | 10/2021 | Tsutsumi | G06F 16/90332 |

OTHER PUBLICATIONS

Francis-Landau, et al., "Capturing Semantic Similarity for Entity Linking with Convolutional Neural Networks", In Journal of Computing Research Repository, Apr. 4, 2016, 07 Pages.

Kleinberg, Jon, "Bursty and Hierarchical Structure in Streams", In Proceedings of Proceedings of the Eighth ACM SIGKDD International Conference on Knowledge Discovery and Data Mining, Jul. 23, 2002, pp. 1-25.

Lecun, et al., "Deep Learning", In Journal of Nature, vol. 521, Issue 7553, May 28, 2015, pp. 436-444.

Leviathan, "Google Duplex: An AI System for Accomplishing Real-World Tasks Over the Phone", Retrieved from: https://ai.googleblog.com/2018/05/duplex-ai-system-for-natural-conversation.html, May 8, 2018, 06 Pages.

Liu, et al., "A Dual Attentive Neural Network Framework with Community Metadata for Answer Selection", In Proceedings of National CCF Conference on Natural Language Processing and Chinese Computing, Nov. 8, 2017, 12 Pages.

"International Search Report and the Written opinion Issued in PCT Patent Application No. PCT/US19/037134", dated Aug. 13, 2019, 12 Pages.

Turol, Sophia, "Automating a Customer Service with Chatbots and Neural Networks", Retrieved from: https://www.altoros.com/blog/machine-learning-for-automating-a-customer-service-chatbots-and-neural-networks/, Nov. 24, 2016, 03 Pages.

Yu, et al., "Ring: Real-Time Emerging Anomaly Monitoring System over Text Streams", In Proceedings of IEEE Transactions on Big Data, Feb. 23, 2017, pp. 1-14.

Hasan, et al., "A Survey on Real-time Event Detection from the Twitter Data Stream", In Journal of Information Science, vol. 44, Issue 4, Aug. 2, 2018, pp. 443-463.

Malliaros, et al., "Graph-based Text Representations: Boosting Text Mining, NLP and Information Retrieval with Graphs", In Proceedings of the WEB Conference, Apr. 23, 2018, 205 Pages.

Meladianos, et al., "An Optimization Approach for Sub-event Detection and Summarization in Twitter", In Proceedings of European Conference on Information Retrieval, Mar. 26, 2018, 12 Pages.

"International Search Report and Written Opinion issued in PCT Application No. PCT/US19/65118", dated Apr. 20, 2020, 12 Pages.

\* cited by examiner

Report Your Issue

Describe Your Problem: — 360

I updated and now English proofing is not working

Submit

Finding Similar Issues — 370

Proofing broken after updating to latest build version

Languages:All
Build 2305.564.3110

See Solution
See Details

— 380

English proofing not working when switching from Russian

Languages:US English, UK English
Build 2305.564.3110

See Solution
See Details

*FIG. 3B*

MACHINE LEARNING APPLICATIONS FOR TEMPORALLY-RELATED EVENTS

BACKGROUND

Many computer-based tools, applications, and devices include an online help or assistance mechanism. The intended functionality of such online help or assistance tools is to provide a user informative, useful, relevant, timely, and accurate content or information (e.g., a tutorial) regarding a topic, subject, or question provided by the user. For example, software applications often include a help search bar, where an applicant can provide keywords or a natural language (NL) phrase regarding a functionality or operation of the application, for which they require assistance. As another example, an operating system (OS) for a computing device may include an "issue" or "bug" reporting tool or feature that enables a user to provide a NL phrase regarding an event or issue that the user has experienced while using the OS. As still another example, virtual assistance (VA) devices enable users to speak a natural language phrase, sentence, or question, regarding a topic for which the user requests additional information.

For such online help or assistance tools to be useful, the tools must provide the requested information in real-time. Furthermore, the online help tools must identify which information to provide via natural language-based user input. Such natural language-based input inherently includes a great variance between individual users, as well as between user sessions for the same user. Furthermore, due to the nature of human languages, natural language-based input may include ambiguities, as well as be subject to multiple interpretations.

Additionally, the number and frequency of user requests that some online help tools receive, in the form of highly-variant natural language-based user input, is significant. Depending on the popularity of an individual online help tool, a tool may receive millions, or even tens of millions of user requests per day or per hour. Temporally based (or newly emergent) issues or events, such as bugs or altered functionalities associated with software updates could significantly increase the already large baseline-volume of user requests for information. For example, an update for a mobile application (i.e., an app) may inadvertently result in disabling a particular functionality in the app. Due to the large number of users receiving the app update during a relatively small window of time, an online help tool may receive a "burst" of requests regarding the broken functionality of the app.

Based on these and other constraints, challenges, and requirements, such online help tools must be able to, in real-time and accurately, classify greatly-varying natural language phrases (e.g., user requests) into one or more categories, where each category can be mapped to a set of content (or information) regarding the phrase. Once classified, and in response to the request, the content mapped to the category can be retrieved and provided to the user. In order to operate in real-time environments that include significant volumes of requests, as well as "temporally-bursty" periods of requests, such natural language phrase categorization, or classification must be computationally efficient, fast, accurate, and precise.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Such sequences of objects may include, but are not limited to sequences of natural language tokens (e.g., natural language phrases, sentences, paragraphs, and the like), sequences of machine-related events (e.g., sequences of machine-executable commands, operations, network activity, and the like), and sequences of user actions (e.g., sequences of clicks, keyboard strokes, user-selections, and the like). The metadata associated with a received sequence may include, but is not limited to a language (e.g., US English, UK English, German, French, and the like) of a NL phrase included in sequence, a software application identifier that sent the sequence, the application's version or build identifier, or an identifier of the operating system (OS) running the application. The metadata may also include any of a device model/manufacturer of the device that sent the sequence, an identifier of the device (e.g., a MAC address), or a user name and/or user profile/preferences of a user that sent the sequence. The associated metadata may further include a network address of a traffic manager that routed the sequence, a timestamp associated with the sequence, a geolocation associated with the sequence, an identifier of a online platform, webpage, or cloud services associated with the sequence, or any other such information that may be associated with the sequence. Each possible category or classification of a sequence of objects may be associated with an event or issue, such as but not limited to functionality, operability, or topics associated with a computing device or application. Thus, the possible categories or classifications of sequences of objects may be event and/or issue categories or classifications.

In some embodiments, content or information is mapped to (or associated with) each available category or classification. In response to classifying a sequence of objects as being associated with a category, the content mapped to the category may be accessed and/or provided. The embodiments may be employed by (or included in) an online help or assistance tool. For example, the sequence of objects may be a received natural language (NL) phrase and be associated with a user request for information pertaining to a topic or issue indicated via the NL phrase. Once the NL phrase has been classified, the associated content, which includes the requested information, may be accessed and provided to the user. Various embodiments may be real-time embodiments, in that the classification of a sequence and providing content associated with the classification may be performed in real-time, or at least in near real-time At least one embodiment includes receiving a plurality of sequence. Each of the plurality of sequences may include a sequence of objects. A plurality of events or issues is detected or identified based on analyzing k-skip-n-grams included in the plurality of sequences. For each event of the detected plurality of events, a graph is generated. The graph for a particular event includes z-cliques that correspond to portions of the k-skip-n-grams that are included in the plurality of sequences that are associated with the particular event. A first sequence of objects is received. The first sequence is separate from the plurality of objects. The first sequence of objects includes a first plurality of k-skip-n-grams. A trained classifier is employed to classify the first sequence of objects as being associated with a first event of the detected plurality of events. Classifying the first sequence of objects is based on a comparison between the first plurality of k-skip-n-grams and the z-cliques of the graph that is generated for the first event. Tutorial content that is associated with the first event is accessed and/or retrieved. The tutorial content is provided to a computing device, or a user of the computing device. The computing device may have provided the first sequence of objects.

In some embodiments, a labeled training dataset is generated. The training dataset includes the received sequences and a label indicating one of the detected plurality of events for each of the sequences. Supervised machine learning methods and the labeled training dataset are employed to train the classifier to classify each of the plurality of sequences as the event indicated by the corresponding label.

In at least one embodiment, metadata associated with the first sequence of objects is received. The comparison between the first plurality of k-skip-n-grams and the z-cliques of the graph is encoded in a first vector. The first vector may be a clique similarity vector. The metadata associated with the first sequence of objects is encoded in a second vector. The second vector may be a metadata vector. An input vector based on a concatenation of the first and the second vectors is generated. The input vector may be a sequence vector. The input vector and the trained classifier are employed to classify the first sequence of objects as being associated with the first event. The trained classifier may be implemented by a neural network with at least two hidden layers. The plurality of sequences may include a plurality of natural language (NL) phrases. Each of the plurality of NL phrases indicates a request for information associated with one of the detected plurality of events.

In some embodiments, to detect or identify the plurality of events or issues, a burst detection algorithm is executed. The burst detection algorithm determines a burst level, burst start time, and burst end time of the k-skip-n-grams. Based on the burst level, burst start time, and burst end time, the k-skip-n-grams are identified. The identified k-skip-n-grams that are currently bursting and that started within a specified time period. Constrained z-clique finding is performed on the graph of the identified k-skip-n-grams. Constrained clique percolation may also be performed on the graph. Cliques are identified, where a set of sequences have all objects included therein. The burst detection algorithm is applied or executed over times at which plurality of sequences has occurred. Based on the determined burst detections, the plurality of events or issues are detected or identified. There may be no overlap of cliques of the plurality of events.

BRIEF DESCRIPTION OF THE DRAWINGS

Aspects of the disclosure are described in detail below with reference to the attached drawing figures, wherein:

FIG. 3B illustrates a non-limiting example embodiment of a user interface provided to the user;

DETAILED DESCRIPTION

Figure 1:
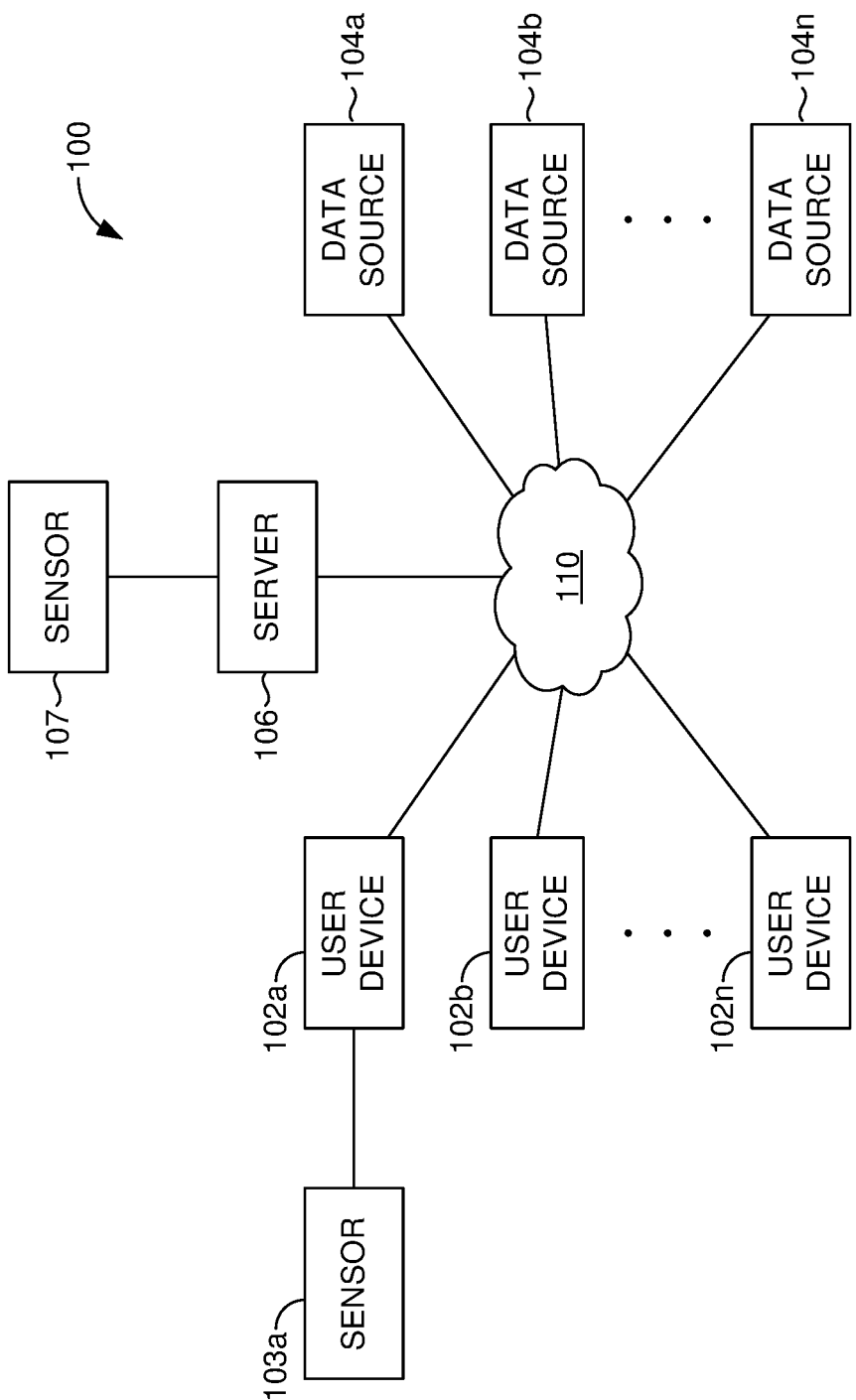
FIG. 1 is a block diagram of an exemplary computing environment suitable for use in implementing embodiments of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

Briefly, the various embodiments are directed towards enhanced methods and systems for classifying a sequence of objects (e.g., sequences of natural language tokens, machine-related events, user actions, and the like) into one or more categories or classifications. Such sequences of objects may include, but are not limited to sequences of natural language tokens (e.g., natural language phrases, sentences, paragraphs, and the like), sequences of machine-related events (e.g., sequences of machine-executable commands, operations, network activity, and the like), and sequences of user actions (e.g., sequences of clicks, keyboard strokes, user-selections, and the like). Each possible category or classification of a sequence of objects may be associated with an event or issue, such as but not limited to functionality, operability, or topics associated with a computing device or application. Thus, the possible categories or classifications of sequences of objects may be event and/or issue categories or classifications.

In some embodiments, content or information is mapped to (or associated with) each available category or classification. In response to classifying a sequence of objects as being associated with a category, the content mapped to the category may be accessed and/or provided. The embodiments may be employed by (or included in) an online help or assistance tool. For example, the sequence of objects may be a received natural language (NL) phrase and be associated with a user request for information pertaining to a topic or issue indicated via the NL phrase. Once the NL phrase has been classified, the associated content, which includes the requested information, may be accessed and provided to the user. Various embodiments may be real-time embodiments, in that the classification of a sequence and providing content associated with the classification may be performed in real-time, or at least in near real-time.

The identification of various event/issue categories or classifications for sequences of objects may be based on one or more machine learning (ML) methods, such as but not limited to unsupervised clustering methods. A graph of connected objects (e.g., NL tokens) may be generated for each identified event or issue. The nodes of the graph for an issue or event include objects (e.g., NL tokens) within sequences associated with the issue or event, and the edges of the graph indicate relationships or associations between the objects within sequences associated with the issue or event. Thus, the graph characterizes each event or issue, which is associated with a category or classification. Once the event or issue categories have been identified and the corresponding graphs are generated, various ML methods, such as but not limited to supervised ML methods, may be employed to train the embodiments to classify various sequences of objects to one or more of the identified categories. In some embodiments, each incoming or received sequence may be compared to the graph for each possible category. More particularly, k-skip n-grams of the sequence may be generated. Each graph may be inspected to identify one or more cliques of the graph that correspond to each k-skip n-gram of the sequence. A clique similarity for each possible category (corresponding to the graph) is determined based on the identification of the cliques corresponding the sequence. The clique similarity may be combined with various metadata for each sequence. Such metadata may include, but is not limited to a NL, OS, application version or build identifier, timestamp, device identifier (e.g., a MAC address), a network identifier, a user name, or geolocation associated with the sequence. The combination of the clique similarity and the metadata may be employed to classify the sequence, as one or more of the possible event/issue categories or classifications. For example, a vector encoding the combination of the clique similarities and the metadata may be provided to a classifier neural network (NN) that has been trained to classify the vector as one or more of the possible event or issues categories.

As a non-limiting example, a first user may seek help to open a file or document that the user is currently experiencing difficulty opening. To request information regarding opening the file, the first user may speak or type the NL phrase "Hi, I can't open my file, there is no text shown," to an online help tool, such as but not limited to a virtual assistant (VA) or a help search bar, included in an operating system (OS) of the user's device. The embodiments may classify the NL phrase "Hi, I can't open my file, there is no text shown," as being associated with the issue or event of "opening file." Based on the classification, the embodiments may access and provide, in real-time or near real-time, instructional content (e.g., a tutorial) for opening a file. To handle the variance, ambiguity, and/or uncertainty inherent in users' employment of NL phrasing, the embodiments may classify different, but similar in meaning, sequences of objects as the same category. In the above example, a second user may request assistance by providing the NL phrase, "This file fails to open," while a third user may request assistance by providing the NL phrase "Something is wrong because my file appears broken." The embodiments may classify all three NL phrases as the same category associated with "opening file" and provide the same instructional content to the first, second, and third users/

In another non-limiting example, the English-language spell checking and/or proofing functionality of a software application may have stopped operating properly after an update to the application. A user may speak or type into a "bug reporting" interface of the application the NL phrase, "I updated and now English proofing is not working." The embodiments may classify the NL phrase as belong to a category that is associated with "proofing functionality not operating," and provide informative content surround the issue. For instance, the provided content may instruct the user how to repair and/or re-configure the English-language proofing functionality of the application. In at least some embodiments, the classification and providing of content may be operable in "temporally-bursty" environments, such as when numerous users experience and provide feedback associated with an event or issue in a relatively narrow temporal window, such as but not limited to reporting a "bug" associated with a software update. The embodiments may detect and/or identify emerging issues and/or new events. For instance, in the above example regarding the update-induced inoperability of the English-language proofing functionality of an application, the embodiments may detect and identify the bursty user feedback associated with the bug. Based on the identification of this new issue, the embodiments may create a new category for the issue, and begin to classify future user feedback as the new category, and provide instructive content associated with the newly detected issue.

Conventional methods of classifying sequences of objects (such NL phrases) may involve humans manually labeling examples of sequences. However, as the volume and frequency of received sequences increases, the manual labeling of examples quickly becomes impractical and may not be responsive to the real-time requirements of fulfilling frequent and/or "bursty" user requests. In contrast to these manual conventional methods, the enhanced embodiments herein are fully automated, and do not require the manual labelling of example sequences. Furthermore, the enhanced embodiments herein are computationally efficient, and are responsive to real-time environments with frequent and/or bursty user requests.

Some conventional methods of classifying sequences are at least partially automated, but may not detect and identify newly emergent issues or events, such as bugs or malfunctions associated with software updates. These partially-automated conventional methods may model the temporal dimension of the streams of user requests, e.g., bursty streams of user requests. In contrast to these conventional methods, the embodiments herein automatically detect and identify new issues and events, as well adequately model the temporal dimension of the streams of user requests. In contrast to convention methods, the enhanced embodiments herein combines the use of graphs to model the events and issues, as well as cliques of the graphs and clique similarity metrics, along with supervised ML classification methods to classify or categorize the sequences. In still further contrast to conventional methods, the enhanced embodiments combine a clique similarity metric of the sequenced (determined via the graphs and cliques) along with metadata associated with the sequence to refine and improve the reliability of the classification methods.

The various embodiments may detect and/or identify issues or events associated with sequences of objects via receiving a stream of sequences of objects (e.g., a stream of user requests or feedback), clustering the sequences via unsupervised ML methods, and generating the graphs/cliques of the events or issues based on the clusters. Each cluster corresponds to an event or issue and is associated with a graph generated via the sequences of objects included in the cluster. Various embodiments of detecting and/or identifying events or issues are described in U.S. patent application Ser. No. YYZ, entitled EVENT DETECTION BASED ON TEXT STREAMS, filed on Month, date, and, the contents of which are incorporated herein in the entirety. It should be noted that these methods are enabled to automatically detect and identify events or issues in high-volume and/or bursty streams of sequences. In an offline mode, a classifier, such as but not limited to a deep learning (DL) classifier neural network (NN) is trained to classify the sequences based on the sequence's similarity to one or more cliques in the graphs of the events. The training may include supervised training. Metadata associated with the sequence may be combined with the sequence's clique similarity metric to increase the accuracy of the classifications. Because most of the computation is performed in the offline training of the classifier, the enhanced embodiments are fast and efficient. That is, the embodiments can satisfy user requests in environments that include very large and/or bursty streams of sequences.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, a local area network (LAN) and/or a wide area networks (WAN). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100; data structures 120, 140, and 160 described in connection to system 200 described in connection to FIG. 2A. (For instance, in one embodiment, data sources 104a through 104n provide (or make available for accessing) user data to user-data component 210 of FIG. 2A.) Data sources 104a and 104b through 104n may be discrete from user devices 102a and 102b through 102n and server 106 or may be incorporated and/or integrated into at least one of those components. In one embodiment, of data sources 104a through 104n comprise sensors 103a, 107, which may be integrated into or associated with the user device(s) 102a, 102b, or 102n or server 106. Examples of sensed user data made available by data sources 104a through 104n are described further in connection to user-data collection component 210 of FIG. 2A.

Figure 2:
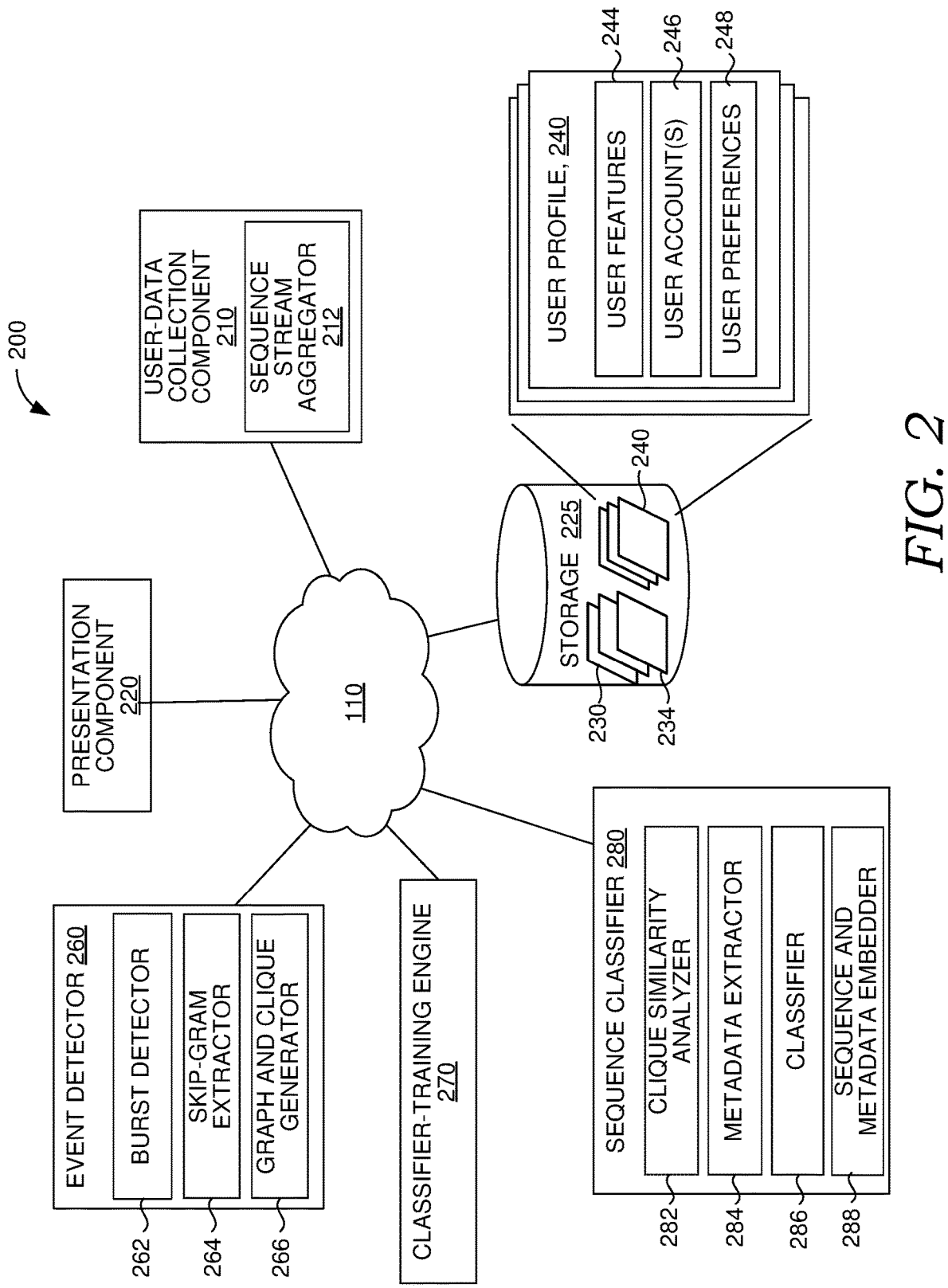
FIG. 2 is a block diagram illustrating an enhanced system in which some embodiments of the present disclosure may be employed.

Operating environment 100 can be utilized to implement a component of the components of enhanced event classification system 200, described in FIG. 2, including components for automatically detecting and identifying events or issues, and classifying sequences objects in a stream as being associated with one or more of the events or issues. Operating environment 100 also can be utilized for implementing aspects of process flows 400, 500, 540, 560, 600, and 620 described in conjunction with FIGS. 4-6B.

Referring now to FIG. 2, in conjunction with FIG. 1, a block diagram is provided showing aspects of an example computing system architecture suitable for implementing an embodiment of the disclosure and designated generally as an enhanced system 200 for classification of sequences of objects based on clique similarity and metadata associated with the sequences of objects. The sequences of object may be automatically classified in one or more categories or classifications, where each category or classification corresponds to an event or issue. Some of the embodiments automatically detect and/or identify the events or issues. Such sequences of objects may include, but are not limited to sequences of natural language tokens (e.g., natural language phrases, sentences, paragraphs, and the like), sequences of machine-related events (e.g., sequences of machine-executable commands, operations, network activity, and the like), and sequences of user actions (e.g., sequences of clicks, keyboard strokes, user-selections, and the like). Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

The sequence classification system 200 includes network 110, which is described in connection to FIG. 1, and which communicatively couples components of system 200, including but not limited to user-data collection component 210, presentation component 220, user profile 240 (through storage 225), event (or issue) detector 260, classifier training engine 270, and sequence classifier 280. Storage 225 may store sequences and content associated with one or more events or issues.

As noted, system 200 provides an enhanced pipeline for the automatic classification of sequences of objects based on clique similarity and metadata associated with the sequences of objects. In the various embodiments, system 200 receives a stream of sequences. For example, system 200 may be included in and/or employed by an online help or assistance tool. In such embodiments, system 200 may receive and/or monitor a stream of natural language (NL) phrases, provided via users, requesting content pertaining to an issue or event they are experiencing. For instance, a first user may be requesting information about opening a file and provides system 200 with the NL phrase "Hi, I can't open my file, there is no text shown." Enhanced system 200 may automatically classify and/or associate the NL phrase (i.e., a sequence of NL tokens) with the issue of opening a file. System 200 accesses and provides informative content (e.g., a tutorial) to the user regarding how to open a file. In another example, a second user may request information regarding an apparent bug in a software application after updating the application. The second user may provide system 200 with the NL phrase "I updated and now English proofing is not working." System 200 may classify the NL phrase as an issue relating to broken proofing after updating the application to the latest build version and provide content to the user pertaining to the issue. Although many of the embodiments discussed herein are related to classifying NL phrases (e.g., in the context of an online help or assistance tool), other embodiments are not so constrained, and may be directed towards classifying sequences of objects other than NL tokens, such as but not limited to machine-related events and/or user actions. System 200 may be a real-time, or at least near real-time, system and be enabled to classify sequences in real-time upon receiving the sequence.

User-data collection component 210 is generally responsible for accessing, receiving, and/or monitoring a stream of sequences. In addition to an online help too, user-data collection component may receive sequences from electronic messaging systems, app store review systems, media review systems, service centers, and the like. User-data collection component 210 may include a sequence stream aggregator 212 that aggregates, filters, searches, sorts, indexes, or otherwise processes the sequences as the sequences are received. User-data collection component 210 may access or receive (and in some cases also identify) user data from a data source, such as data sources 104a and 104b through 104n of FIG. 1.

Presentation component 220 may be employed in conjunction with user-data collection component 210 to receive the sequence stream, as well as provide the requested content to the user. For example, presentation component 220 may provide the user with tutorial content directed toward an event or issue regarding the classification of the user-provided NL phrase.

Event detector 260 is generally responsible for analyzing the sequences to detect and/or identify issues or events associated with sequences of objects via receiving a stream of sequences of objects (e.g., a stream of user requests or feedback), clustering the sequences via unsupervised ML methods, and generating the graphs/cliques of the events or issues based on the clusters. Each cluster corresponds to an event or issue and is associated with a graph generated via the sequences of objects included in the cluster. Various embodiments of detecting and/or identifying events or issues are described in U.S. patent application Ser. No. YYZ, entitled EVENT DETECTION BASED ON TEXT STREAMS, filed on Month, date, and, the contents of which are incorporated herein in the entirety. It should be noted that these methods are enabled to automatically detect and identify events or issues in high-volume and/or bursty streams of sequences. Furthermore, event detector 260 is enabled to implement and/or carry out and of the functionality, operations, or methods discussed in the YYZ application.

Event detector 260 is an enhanced event detector that detects events in batches or in a rolling period of time. That is, event detector 260 may detect events or issues in an offline mode via analyzes streams of sequences in a batch mode. In other embodiments, event detector 260 may detect events in real-time via an online mode. Thus event detector 260 may be an offline event detector or an online event detector. In the online mode, event detector 260 may detect events via analyzing the sequences occurring in a rolling window of time, e.g., hourly, daily, weekly, monthly, or the like rolling time windows. Such online or offline event detection may identify the onset of new events from sequence streams in real-time, via a rolling window, or in batches.

While some conventional event detectors may detect events in real-time, such conventional detectors typically require pre-defined keywords for a given topic or event, making it inapplicable for general bursty topic or event detection where no prior knowledge of the topic keywords is available. Some conventional event detectors may aggregate keywords into larger topics but wait until the end-of-day or a fixed time period. Furthermore, in conventional event detectors, the number of topics must be defined in advance, which is undesirable because it is typically not known how many separate issues are occurring at any given time.

In contrast to such conventional event detectors, enhanced event detector 260 enables the timely and reliable identification of issues or events from stream sources that include sequences of objects (e.g., a NL text stream). In various embodiments disclosed herein, enhanced event detector 260 may analyze sequence stream sources to identify events indicative of new or emerging issues, such as issues or events associated with products and services. In some embodiments, enhanced event detector 260 enables the identification of large events (e.g., the malfunction of a software application after an operating system (OS) update) that may result in an extremely high volume and/or "bursty" stream of user requests or bus reports. Event detector 260 is also enabled to detect smaller events (e.g., a font issue) that may result in a smaller increase in volume of associated sequence streams. Thus, event detector 260 allows for the detection of large events very quickly (e.g., less than 30 minutes) while also allowing for the detection of smaller events. In some embodiments, detection of smaller events may be performed by identifying a small but sustained increase in the rate of feedback (e.g., 2 days) within the stream source. This may allow for a reduction of the Time to Detect (TTD) and thus allow service and product providers to more quickly and more reliably identify and mitigate issues, allowing for more efficient operation of applications and increased customer satisfaction.

Additionally, enhanced event detector' 260 ability to identify and differentiate between events may allow for the separate recognition of each issue and their resolution. If issues are not identified separately, they may be merged and one or all issues may go undetected, resulting in delays in resolving each issue.

Feedback aggregation across the detected community graphs allows for event detection to be performed across a range of vocabulary that represents an issue. For example, NL text phrases such as "can't open my emails today" and "outlook won't open today" may be treated as the same issue and thus both phrases may contribute to the same detection threshold criteria. This may facilitate increased detection sensitivity and reduce detection time.

To carry out its functionalities, operations, responsibilities, or methods, event detector 260 may include a burst detector 262, a skip-gram extractor 264, and a graph and clique generator 266. Burst detector 260 is generally responsible for detecting bursts of sequences within the sequence streams. Skip-gram extractor 264 is generally responsible for extracting skip-grams of the objects included in a sequence. Graph and clique generator 266 is generally responsible for generator graphs and determining the cliques within the generated graphs, based on the extracted skip-grams of objects.

Generally, event detector 260 may receive or access sequences of objects via sequence stream aggregator 212 or storage 225. In some embodiments, storage 225 may store aggregated data streams (e.g., streams of sequences of objects) from various sources as discussed throughout. That is, event detector may receive and/or access new feedback (sequences) in either real-time or in batches. The new feedback may include a plurality of sequences, such as user provided NL phrases regarding events or issues to be detected and/or identified (e.g., user feedback). Event detector 260 may pre-process the sequences across to clean and tokenize the objects included in each sequence. For example, sequence pre-processing can include stop-word removal, lower-casing, and lemmatization. In some embodiments, text entries may be collected and processed for a rolling period of time such as a one month rolling feedback period.

For each accessed or received sequence, skip-gram extractor 264 can determine or extract unique k-skip-n-grams in the sequence. The parameters k and n may be tuned based on the nature of characteristics of the sequences. However, in at least one embodiment, n=2, and k may be based on the mean or maximum length of the received sequences. As a non-limiting example, a received sequence may include the NL phrase "my outlook program is not working." Skip-gram extractor 264 may extract the k-skip-n-grams (where k=4 and n=2): (my outlook), (my program), (my is), (my not), (my working), (outlook program), (outlook is), (outlook not), (outlook working), and the like. Note that the list is not complete, but skip-gram extractor 264 may extract all possible k-skip-gram from the sequence. To illustrate another non-limiting example, the NL phrase "the outlook app is a bad program, won't load" may be received by event detector 260. Skip-gram extractor 264 may extract the following k-skip-n-grams: (the outlook), (the app), (the is), (the a), (the bad), (the program), (the won't), (the load), (outlook app), (outlook is), (outlook a), (outlook bad), (outlook program), and the like.

In some embodiments, event detector 260 may normalize the extracted skip-grams. Furthermore, event detector 260 may aggregate the k-skip-n-grams across the entire set of received sequences (or at least aggregate in the current batch or current rollback time period). In one embodiment, aggregating may include sorting the set (e.g., in alphabetical order) such that "outlook program"="program outlook." For example, the k-skip-n-gram "outlook program" may be aggregated according to timestamps associated with the sequence, e.g., (Jan. 1, 2017, Feb. 4, 2017, 11:58:29, Mar. 4, 2017, May 4, 2017, Aug. 4, 2017), IDs=(21201, 20201, 29305, 20394, 29395). Event detector 260 may filter the normalized and aggregated skip-grams.

Burst detector 262 is detects burst of sequences and/or k-skip-n-grams included in sequences. Burst detector 262 may apply a finite-state or infinite-state automaton across all unique k-skip-n-grams to detect bursts. As a non-limiting example, burst detector may employ a Kleinberg Burst Detection (KBD) or other similar burst detection algorithm. The applied burst detection algorithm may identify time periods during which an event or issue of interest is uncharacteristically frequent, or "bursty." The burst detection algorithm may be applied over the times at which the feedback has occurred to find the Burst Level (BL), Burst Start Time (BST) and the Burst End Time (BET) of each "bursty" k-skip-n-gram.

Burst detector 262 may identify or determine the set of all k-skip-n-grams that are currently bursting (BET=Current Time, BL>=1) and that started within the past m days (BST>CurrDate−m days). In one implementation, the identified set of k-skip-n-grams may be referred to as "BurstySkipgrams," and m is a parameter that can be tuned, updated, or adjusted to disregard k-skip-n-grams that are likely irrelevant/noise because of the length of time (m) required to become "bursty."

Graph and clique generator 266 is enabled to generate graphs and identify cliques in the generated graph based on the skip-grams. In at least one embodiment graph and clique generator 266 generates the graph based on at least partially the set of "BurstySkipgrams." In other embodiments, the skip-grams need not be bursty in order to contribute to a graph. The nodes (or vertices) of the graph may include the objects comprising the skip-grams (e.g., NL tokens) generating a graph where pairs of vertices connected by an edge represents one of the k-skip-n-grams.

Graph and clique generator 266 is further enabled to identify, determine, and/or detect each of the cliques in the generated graphs. In various embodiments, graph and clique generator 266 is constrained identify all each of the z-cliques in the graph, where z represents the number of nodes in the fully connected subgraphs (i.e., the cliques) in the graph. In at least one embodiment z=3, however z may be a tunable parameter. Cliques, or fully connected subsets or subgraphs of nodes or vertices that are adjacent to each other, may be eliminated where the edges have a range of BST more than x amount of time to obtain the set of cliques, which may be referred to herein as the set S1. In one implementation, x is tunable, which in some embodiments may be automatically determined.

Furthermore, event detector 260 may be enabled to perform constrained clique percolation on the identified z-cliques in the set S1. More specifically, graph and clique generator 266 may identifier clusters, connected, or adjacent z-cliques within a graphs. Two z-cliques are considered clustered, connected, or adjacent if they share (z−1) nodes AND the range of the BST of the combined set of edges is less than p amount of time to obtain the set of constrained z-clique communities. The set of constrained z-clique communities may be referred to as the set S2. In one implementation, p is tunable parameter. In some embodiments p may be automatically determined.

For each community in the set S2, event detector 260 may be enabled to find the set of all sequences (e.g., discrete items of user feedback) that have at least all the objects in at least one clique of the community. The result is the set of related sequences for that clique. This operation may be performed across all cliques in the community to find the set of all community sequences. This set of community sequences may be referred to as the set S3.

For each set of community feedback in the set S3, burst detector 262 may apply a finite-state or infinite-state automaton such as Kleinberg's Burst Detection Algorithm over the times at which the feedback has occurred. The BL, BST and BET of each community may be determined. In one embodiment, a different set of parameters for the burst detection algorithm such as S, Lambda, Lambda2 can be employed at this stage than previously used to apply more stringent requirements for community burst detection.

For each community that is currently bursting (BET=Current Time, BL>=1), burst detector 262 may identify overlapping cliques with bursty communities from the previous iteration. If there is overlap, then the clique is determined to be the same event or issue. Otherwise, a new event or issue is identified. Accordingly, event detector 260 is enabled to quickly and reliably identify issues from sequence stream sources. Such event or issue detection ability may be a valuable resource for service and product providers, such as but not limited to online help or assistant tools (e.g., a virtual assistant). In various embodiments disclosed herein, the sequence stream sources may be analyzed to identify events indicative of new or emerging issues with products and services. Issues may arise as a result of product updates, server issues, bugs in code, etc., and the techniques described herein may be used to analyze sequence stream sources, including large volumes of feedback, to detect such issues automatically in a quick and reliable manner.

In some embodiments, sequence stream sources may be analyzed using a dynamic monitoring period. Events or issues may be identified over different periods of time rather than a fixed time period. Some embodiments may further employ constrained-graph creation techniques to differentiate events or issues that occur within a similar time period. Furthermore, community burst detection may be implemented that aggregates text streams related to an issue and performs burst detection on the aggregated text streams Because event detector 260 provides functionality to analyze sequence stream sources and identify events or issues as described herein, the need for extensive investigative testing may be reduced or eliminated. Additionally, the enhanced embodiments herein are enabled to more quickly, as compared to conventional methods, provide new or modified features (e.g., providing informative content) that may be in response to identified issues. Furthermore, implementation of analysis at the sequence stream level can allow for greater accuracy and relevance of the collective information being streamed. For example, if issues are identified after filtering and selection of self-reported feedback, some issues may be completely missed, issues may not be properly prioritized, related issues may not be identified, or issues may be improperly identified as being separate when they are really the same issue. By collecting the raw sequence stream sources and comprehensively analyzing the data, more accurate issue spotting may be provided while reducing investigative cost.

Text stream sources that relate to erroneous behavior is one type of data that may be collected and used for analysis and issue spotting. Other sequence stream sources may also be used that may be analyzed to identify some indication of quality. Typically, the sequence stream sources may be collected from multiple devices and can be sent over network 110 to event detector 260, which may execute on a server, and/or which may be housed in a data center. An entity such as a device manufacturer or service provider may collect and aggregate the sequence stream before and after analysis. The entity can monitor quality of multiple devices and applications. The entity may also analyze the issues to identify trends and profiles of common failure modes.

In some cases, via the functionality of event detector 260, an entity may identify a maintenance issue for a device and send an alert to the device so that the user may take an appropriate action. For example, data collected (i.e., a sequence of security-related objects) for a particular device may indicate that the sequence stream data indicates observations that are characteristic of a security event. In some embodiments, the event detector 260, or any other component of enhanced system 200, may execute on a server. Sequence stream data may be collected and analyzed on the server. In other embodiments, the event detector 260, or any other component of enhanced system 200, may be cloud-based or otherwise implemented across multiple servers.

The sequence stream data collection functionality that may be implemented by user-data collection component 212 may be configurable. The sequence stream data collection rates and data collection types may be configured by appropriate interfaces such as an application programming interface or some other control mechanism for configuring the analytic engine. The sequence stream may be collected for defined time periods, or on a continuous basis or periodic basis.

In some embodiments, the collected sequence stream may be analyzed, via event detector 260, to determine statistical information. Furthermore, data mining may be performed to identify trends and patterns related to function, health, and performance. In one embodiment, event detector 260 may include a rate detection vector engine. The detection vector engine may incorporate a Naive Bayes classifier, fuzzy logic, and other methods. The detection vector engine may be configured to determine which data patterns are relevant for error analysis.

Event detector 260 may allow the stored data to be accessible via a web site, or may allow the data to be accessible to users via a cloud-based system. The analytics engine may also allow device support and operations services to access the data via the web site or through a side channel. The device support and operations services can therefore access the identified issues and supporting data to provide appropriate and timely services to users. For example, design and quality assurance personnel can access the data to make improvements to the design and production processes Classifier training engine 270 is enabled to train a classifier model implemented by sequence classifier 280, to classify the sequences as one or more of categories or classifications associated with the events or issues detected by event detector 260. In some non-limiting embodiments, classifier-training engine 270 may employ machine learning (ML) methods, such as but not limited to supervised ML methods to train sequence classifier 280. In at least one embodiment, the classifier model may be implemented via a neural network, such as but not limited to a deep learning (DL) classifier neural network. As discussed throughout, in addition to the objects included in a particular sequence, metadata associated with a particular sequence may be employed to enable more accurate and/or precise classification of the particular sequence. Sequence classifier 280 may include one or more of a clique similarity engine 282, a metadata extractor 284, a classifier 286, and a sequence and metadata embedder 288.

The functionality of classifier-training engine 270, pertaining to the training of the classifier model implemented by classifier 286, will be discussed below, including at least in conjunction with process 620 of FIG. 6B. However, for the purposes of the present discussion, a properly trained classifier model is assumed. To classify a received sequence (which may be employed via event detector 260 to detect events as described above, or may arrive after the events or issues have been detected), the sequence, along with associated metadata, is received and/or accessed sequence classifier 280. The metadata associated with a received may include, but is not limited to a language (e.g., US English, UK English, German, French, and the like) of a NL phrase included in sequence, a software application identifier that sent the sequence, the application's version or build identifier, or an identifier of the operating system (OS) running the application. The metadata may also include any of a device model/manufacturer of the device that sent the sequence, an identifier of the device (e.g., a MAC address), or a user name and/or user profile/preferences of a user that sent the sequence. The associated metadata may further include a network address of a traffic manager that routed the sequence, a timestamp associated with the sequence, a geolocation associated with the sequence, an identifier of a online platform, webpage, or cloud services associated with the sequence, or any other such information that may be associated with the sequence. Metadata extractor 284 is generally responsible for extracting and/or identifying the associated metadata within the sequence stream. In one embodiment, metadata extractor 284 separates the metadata from the associated sequence.

Classifier 286 is generally responsible for determining or identify one or more categories and/or classifications of a received sequence based on the sequence and the associated metadata. Each potential category or classification may correspond to, or be associated with, one of the events and/or issues detected by event detector 260. In some embodiments, classifier 286 may implement a classifier (or classification) model to perform the classification of a sequence. The classifier model may receive one or more input vectors as an input and generate and/or determine an output vector for output. The input vector may encode information based on the sequence and the associated metadata. The output vector may encode a probability or likelihood of classification for each of the potential categories or classification. For example, the output vector may be of dimensionality m, where m is a positive integer that corresponds to the number of events or issues detected by event detector 260. Thus, the output vector of event classifier 286 may be an event classifier vector, because it classifies an received sequence as one or more event or issue classes. In at least one embodiment, the dimensionality of the input vector may be u, where u is a positive integer. Because the input vector encodes the information about the sequence (objects included in the sequence and metadata associated with the sequence), the input vector may be a sequence vector of dimensionality of u. In some embodiments, the sequence vector is a combination of a clique similarity vector and a metadata vector. The clique similarity vector may encode clique similarity metrics that indicate the similarity of the objects in the sequence to z-cliques of the graphs associated with each of the categories and/or classification. The metadata vector may encode the metadata associated with the sequence. In some embodiments, the dimensionality of the similarity vector may be s and the dimensionality of the metadata may be t, where s and t are positive integers and s+t=u. As will be shown below, in some embodiments s=m and u=m+t. That is, the dimensionality of the clique similarity vector may be equivalent to the number of potential categories or classifications. In at least one embodiment, each dimension of the clique similarity vector corresponds to a similarity metric to one of the potential categories or classifications. As noted above, the classifier model of classifier 286 may be implemented by a neural network, such as but not limited to a DL classifier NN.

Once the metadata is extracted, clique similarity analyzer 282 may compare the sequence to the cliques of the graph for each of the identified events or issues. Sequence and metadata embedder 288 may generate a clique similarity vector for the sequence based on the comparisons performed via clique similarity analyzer 282. That is, sequence and metadata embedder may embed and/or encode information about the sequence in a vector space. Embedding information about the sequence into a vector space may include embedding clique similarity information (e.g., clique similarity metrics) into the vector space. As such, embedding information about the sequence may be based on clique similarity metrics determined via the comparisons of the clique similarity analyzer 282. The dimensionality of the vector space may be equivalent to, or at least approximately equal to, the number of distinct detected events or categories that the sequence may be categorized into. That is, as noted above, the dimensionality of the sequence vector (i.e., a clique similarity vector) may be represented as s, where s=u.

Figure 3A:
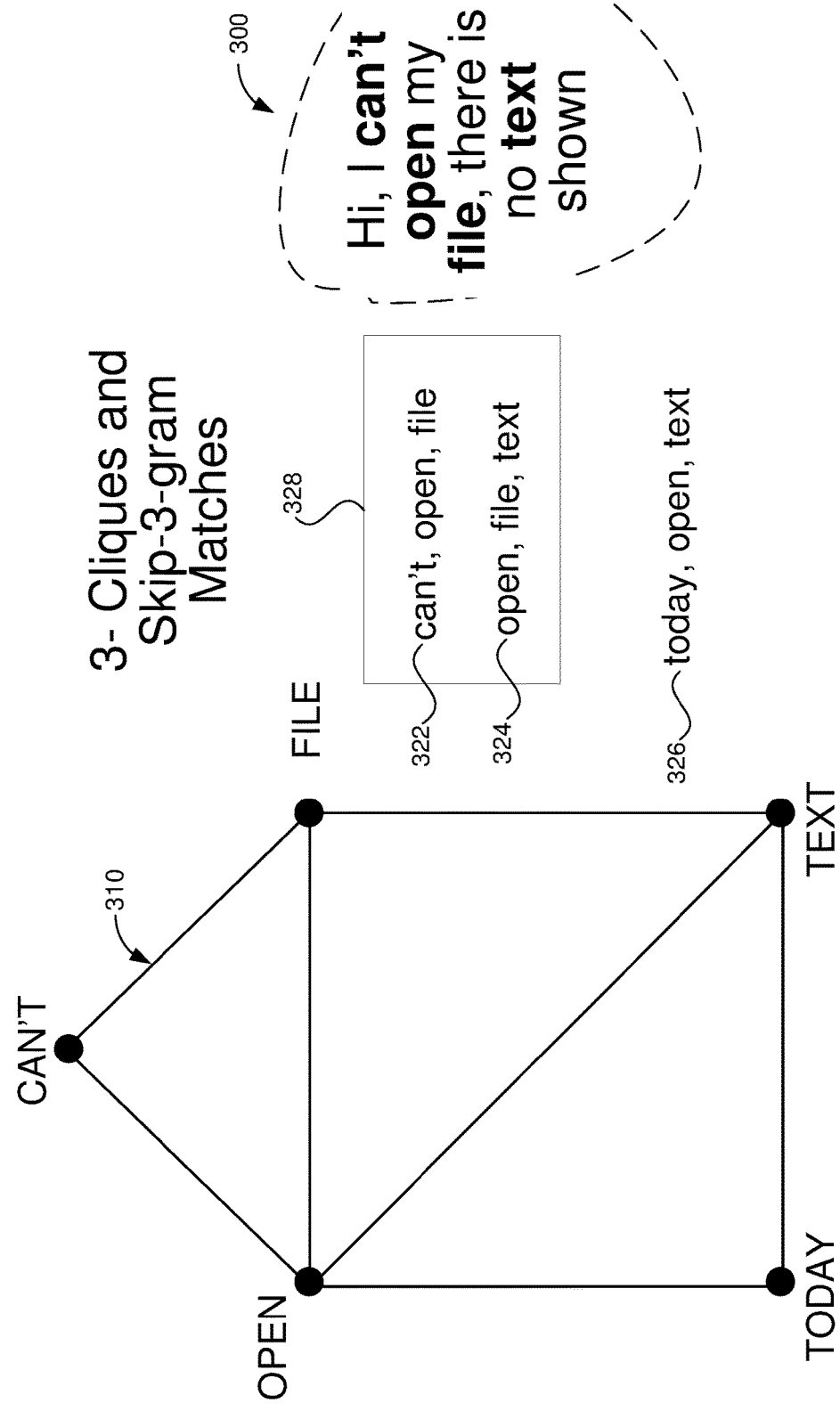
FIG. 3A illustrates a non-limiting example embodiment of a process that a clique similarity analyzer may perform when comparing a received sequence to a graph of a detected event or issue that is consistent with some of the embodiments.

FIG. 3A illustrates a non-limiting example embodiment of a process that clique similarity analyzer 282 may perform when comparing a received sequence to a graph of a detected event or issue. Sequence classifier 280 may receive the NL phrase 300 (i.e., a sequence of NL tokens) "Hi, can't open my file, there is no text shown." FIG. 3A illustrates at least a partial graph 310 for the detected event or issue associated with "opening file." As noted in conjunction with the discussion directed towards event detector 260, the nodes (or vertices) of graph 310 include the objects (e.g., NL tokens) associated with or connected to the issue "opening file." Thus, graph 310 includes nodes of the following NL tokens: "can't," "open,", "file," "today," and "text." The nodes are connected via edges, where an edge represents a connection between two NL tokens associated with a bursty skip-gram, as discussed above.

During the comparison between the sequence and the graphs for each potential category associated with an event or issue, clique similarity analyzer 282 determines the number of k-skip-n-grams of the sequence 300 that are represented by one of the z-cliques of the associated graph. At noted above, the parameters z, k, and n may be varied amongst the embodiments. In at least one embodiments, z=n. In the embodiment shown in FIG. 3A, z=n=3 and k=9. Graph 310 includes three 3-cliques. The 3-cliques of graph 310 include the triangular subgraphs defined by the corresponding set of nodes respectively: (can't, open, file), (open, file, text), and (today, open, text). Three k-skip-n-grams of NL phrase 300 are shown in FIG. 3A as: "can't, open, file" 322, "open, file, text" 324, and "today, open, text" 326.

During the comparisons, clique similarity analyzer 282 determines the number of matches between the k-skip-n-grams of NL phrase 300 and the z-clique fully-connected subgraphs of graph 310. The clique similarity metric (or simply similarity metric) for the category associated with the event or issue is determined based on the number of matches between the k-skip-n-grams of NL phrase 300 and the z-cliques of graph 310. As shown by box 328 of FIG. 3A, there are two matches between the k-skip-n-grams of NL phrase 300 and the z-cliques of graph 310. The k-skip-n-gram "can't, open, file" 322 of NL phrase 300 matches the 3-clique (can't, open, file) of graph 310 and the k-skip-n-gram "open, file, text" 324 of NL phrase 300 matches the 3-clique (open file, text) of graph 310, while the k-skip-n-gram "today, open, text" 326 does not match any of the z-cliques of graph 310. In some embodiments, for a match to occur for a particular k-skip-n-gram and particular z-clique of a graph, every object (e.g., NL token) of the particular k-skip-n-gram must appear as a node of the particular z-clique. In other embodiments, only a fraction of the objects of the k-skip-n-gram must appear in the particular z-clique.

NL phrase's 300 clique similarity metric for the category or classification associated with the event/issue of "opening file" is based on the two matches between the k-skip-n-grams of NL phrase 300 and the z-clique fully-connected subgraphs of graph 310. In some embodiments, the clique similarity metric would be equivalent to the number of matches (e.g., 2). In other embodiments, the clique similarity metric may be a linear or non-linear function of the number of matches. Note that in some embodiments, such as the one shown in FIG. 3A, the clique similarity metric represents a textual similarity between the category associated with the event or issue and the sequence of objects (e.g., a NL phrase), the clique similarity metric may be a textual similarity metric. A clique similarity metric is similarly determined for each category or classification associated with the detected events or issues.

To embed information regarding the sequence into a vector space, sequence and metadata embedder 288 generates the clique similarity vector for sequence, i.e., the sequence vector, of dimensionality s. Each dimension of the s dimensions corresponds to, or is mapped to, one of the potential categories of classifications of the detected events or issues. That is, each of the dimensions of the sequence vector is mapped to a dimension of the output vector. In some embodiments, each component of the sequence vector may be based on, or equivalent to, the clique similarity metric for the graph of the category or event. For the ith received sequence, the sequence vector (e.g., the textual similarity vector) may be referenced by $t_i$. In an embodiment that includes three potential categories or detected events, $t_i$=[1, 3, 2], where the clique similarity metric for the first category is 1, the clique similarity metric for the second category is 3, and the clique similarity metric for the third category is 2. As noted above, the clique similarity score, for a corresponding category or event) may be based on, or be equivalent to, the number of k-skip-n-grams of the sequence that match a z-clique of the graph for the corresponding category or event. In the above example, the received sequence is most similar to (e.g., textually related to) the second category or event.

Sequence and metadata embedder 288 may also embed the associated metadata information into the metadata vector. The metadata information may be encoded via binary vector components representing and/or indicating the each possible value of each possible field of the metadata. For example, one hot encoding (or one-of-k representation) may be used to encode and/or embed the associated metadata via the metadata vector. Thus, the dimensionality of the metadata vector (t), may be equivalent to the sum of the number of possible values for each metadata field. As a non-limiting embodiment, the metadata may include a two fields, where the first field is associated with b possible values and the second field is associated with c possible values, where b and c are positive integers, and thus the dimensionality of the sequence vector may be t=b+c. In the one hot encoding embodiments, each component of the metadata vector may be a binary value. For example, the associated metadata may include a first field corresponding to language and a second filed corresponding to OS. The metadata vector may be composed of two sub-vectors, each corresponding to one of the metadata fields. In an example, the first sub-vector, corresponding to the language field, may be [0,1,0], where the sequence is in the language corresponding to the second of three possible language. The second sub-vector, corresponding to the OS field, may be [0, 1], where the sequence is associated with a computing device running the second possible value for its OS. The metadata vector may include a concatenation, or other combination, of the various sub-vectors. Accordingly, the metadata vector for the above example may be represented as a concatenation of the first and second sub-vectors, i.e., [0, 1, 0, 0, 1]. It should be notes that other encodings of the metadata may be employed to generate the metadata vector.

The sequence and metadata embedder 288 may generate a sequence vector ($v_i$) based on a combination of the clique similarity vector and the metadata vector. The combination may include the catenation of the clique similarity vector. Thus, in the above example, of the sequence with three possible categories (where the clique similarity vector is encoded as [1, 3, 2]) and the 2 metadata fields (where the metadata vector is encoded as [0, 1, 0, 0, 1]), the sequence vector may be encoded as $v_i$=[1, 3, 2, 0, 1, 0, 0, 1]. The sequence vector may be provided to the classifier 286, as an input vector.

Classifier 286 is generally responsible for mapping the input sequence vector, $v_i$, to an output event classifier vector $e_i$. The components of the event classifier vector corresponds to probabilities, likelihoods, or confidences that the sequence is classified as the corresponding event or issue. For example, in a embodiment that include five possible values of classification, the output event classifier may be $e_i$=[0.1, 0.4, 0.2, 0.3, 0.0]. In this example, the input sequence has a classification confidence scores of 0.1, 0.4, 0.2, 0.3, and 0.0 for the respective five possible categories. In some embodiments, the sequence is classified or categories as the most likely category. In the above example, the classification of the sequence would be the second possible category, with a confidence score of 0.4. In some embodiments, the possible categorizations are ranked via the corresponding confidence scores.

In various embodiments, sequence classifier 280 is enabled to access and/or retrieve content (e.g., tutorial content) that is related to the classification of the sequence. That is, sequence classifier 280 may retrieve content that is mapped to, or associated with, the event or issue that corresponds to the categorization of the sequence. The presentation component 220 may provide the related (e.g., the requested) content to a user (or computing device) that transmitted the classified sequence. Newly received sequences may be analyzed via event detector to detect newly emergent events or issues, as indicated by the newly received sequences.

Presentation component 220 may provide the user a user interface (UI) that enables the user to provide a sequence, and receive the requested content. FIG. 3B illustrates a non-limiting example embodiment of a user interface 350 provided to the user. UI 350 includes a help search bar 360, where the user can provide and submits a sequence, e.g., the NL phrase "I updated and now English proofing is not working." In real-time, the NL phrase can be classified and information regarding the classification can be provided to the user. UI 350 shows a ranking of possible issues or events related to the NL phrase, as a first possible issue 370 and a second possible issue 380. The user can request and receive additional information regarding both of or either of the two possibly related issues or events 370/380.

Returning to FIG. 2, classifier-training engine 270 is generally responsible for training the classifier model of classifier 286. The classifier model 286 may be implemented by a classifier neural network (NN), with at least two hidden layers. Classifier-training engine 270 may train classifier 286 via supervised machine learning (ML) methods. The received sequences used to detect the events, via event detector 260, may be employed as labelled training data. The categories of the received sequences may be labeled as the event or issue that the sequence was employed to detect or identify. The classifier-training engine 280 may employ the labeled training data to train the NN via supervised ML, e.g., via the labels (or classifications) included in the training data, a defined loss function, backpropagation, and stochastic gradient descent methods. Once trained, the classifier model may be employed to classify additionally received sequences not included in the training data. The classifier model may be re-trained and/or updated as newly emergent issues are detected by event detector 260 and/or new sequences are observed.

The components of enhanced system 200 may be embodied as a set of compiled computer instructions or functions, program modules, computer software services, or an arrangement of processes carried out on a computer system. It should be understood that the system 200 shown in FIG. 2 is an example of one system in which embodiments of the present disclosure may be employed. Each component shown may include a computing device similar to the computing device 900 described with reference to FIG. 7. The enhanced system 200 should not be interpreted as having any dependency or requirement related to any single module/component or combination of modules/components illustrated therein. Each may comprise a single device or multiple devices cooperating in a distributed environment.

For instance, the system 200 may comprise multiple devices arranged in a distributed environment that collectively provide the functionality described herein. Additionally, other components not shown may also be included within the network environment. It should be understood that the system 200 and/or its various components may be located anywhere in accordance with various embodiments.

Example system 200 also includes storage 225. Storage 225 generally stores information including data, computer instructions (e.g., software program instructions, routines, or services), and/or models used in embodiments of the technologies described herein. In an embodiment, storage 225 comprises a data store 234 (or computer data memory). Data store 234 may store a stream of sequence and/or labelled training data. Storage 225 may also include pattern inference logic 230. Briefly, pattern inference logic 230 may include machine learning, statistical, and/or artificial intelligence logic that is enabled to detect, infer, or otherwise recognize patterns and or features within data. For instance, pattern inference logic 230 may infer explicit, latent, or hidden pattern recognition features or patterns within the training data. Further, although depicted as a single data store component, storage 225 may be embodied as a data store or may be in the cloud.

By way of example and not limitation, data included in storage 225, as well as any user data, may generally be referred to throughout as data. Any such data may be sensed or determined from a sensor (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other records associated with events; etc.) including user activity that occurs over more than one user device, user history, session logs, application data, contacts data, record data, notification data, social-network data, news (including popular or trending items on search engines or social networks), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by a sensor component), data derived based on other data (for example, location data that can be derived from Wi-Fi, Cellular network, or IP address data), and nearly any other source of data that may be sensed or determined as described herein. In some respects, date or information (e.g., the requested content) may be provided in user signals. A user signal can be a feed of various data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 210 and/or sequence stream aggregator 212 receives or accesses data continuously, periodically, or as needed.

System 200, or its subcomponents, may determine a device name or identification (device ID) for each device associated with a user. This information about the identified user devices associated with a user may be stored in a user profile associated with the user, such as user profile 240. In an embodiment, the user devices may be polled, interrogated, or otherwise analyzed to determine information about the devices. This information may be used for determining a label or identification of the device (e.g., a device ID) so that the user interaction with the device may be recognized from user data. In some embodiments, users may declare or register a device, such as by logging into an account via the device, installing an application on the device, connecting to an online service that interrogates the device, or otherwise providing information about the device to an application or service. In some embodiments, devices that sign into an account associated with the user, such as a Microsoft® account or Net Passport, email account, social network, or the like, are identified and determined to be associated with the user.

In embodiments using contextual information related to user devices, a user device may be identified by detecting and analyzing characteristics of the user device, such as device hardware, software such as operating system (OS), network-related characteristics, user accounts accessed via the device, and similar characteristics. For example, as described herein, information about a user device may be determined using functionality of many operating systems to provide information about the hardware, OS version, network connection information, installed application, or the like. In some embodiments, a device name or identification (device ID) may be determined for each device associated with a user. This information about the identified user devices associated with a user may be stored in a user profile associated with the user, such as in user profile 240. In an embodiment, the user devices may be polled, interrogated, or otherwise analyzed to determine contextual information about the devices. This information may be used for determining a label or identification of the device (e.g., a device ID) so that user activity on one user device may be recognized and distinguished from user activity on another user device. Further, as described herein, in some embodiments, users may declare or register a user device, such as by logging into an account via the device, installing an application on the device, connecting to an online service that interrogates the device, or otherwise providing information about the device to an application or service. In some embodiments, devices that sign into an account associated with the user, such as a Microsoft® account or Net Passport, email account, social network, or the like, are identified and determined to be associated with the user.

Data stored in user profile 240 (to this point) will now be discussed and summarized. User profile 240 may include various information or data associated with a user. As such, user profile 240 may user features 244, user accounts 246, and/or user preferences 248.

As described herein, user features 244 in user profile 240 are generated based on different user signals, such as location history, user accounts, etc. User features 244 generally include those features related to the user. User account(s) data 246 generally includes user data collected from user-data collection component 210 and/or sequence stream aggregator 212 (which in some cases may include crowd-sourced data that is relevant to the particular user) or other semantic knowledge about the user. In particular, user account(s) data 246 can include data regarding user emails, texts, instant messages, calls, and other communications; social network accounts and data, such as news feeds; online activity; calendars, appointments, or other user data that may have relevance for determining unaddressed events; user availability; and importance, urgency, or notification logic. Embodiments of user account(s) data 246 may store information across a database, knowledge graph, or data structure. User preferences 248 generally include user settings or preferences associated with the user or user records.

As noted above, pattern inference logic 230 contains the rules, conditions, associations, classification models, and other criteria to execute the functionality of any of the components, modules, analyzers, generators, and/or engines of systems 200.

Figure 4:
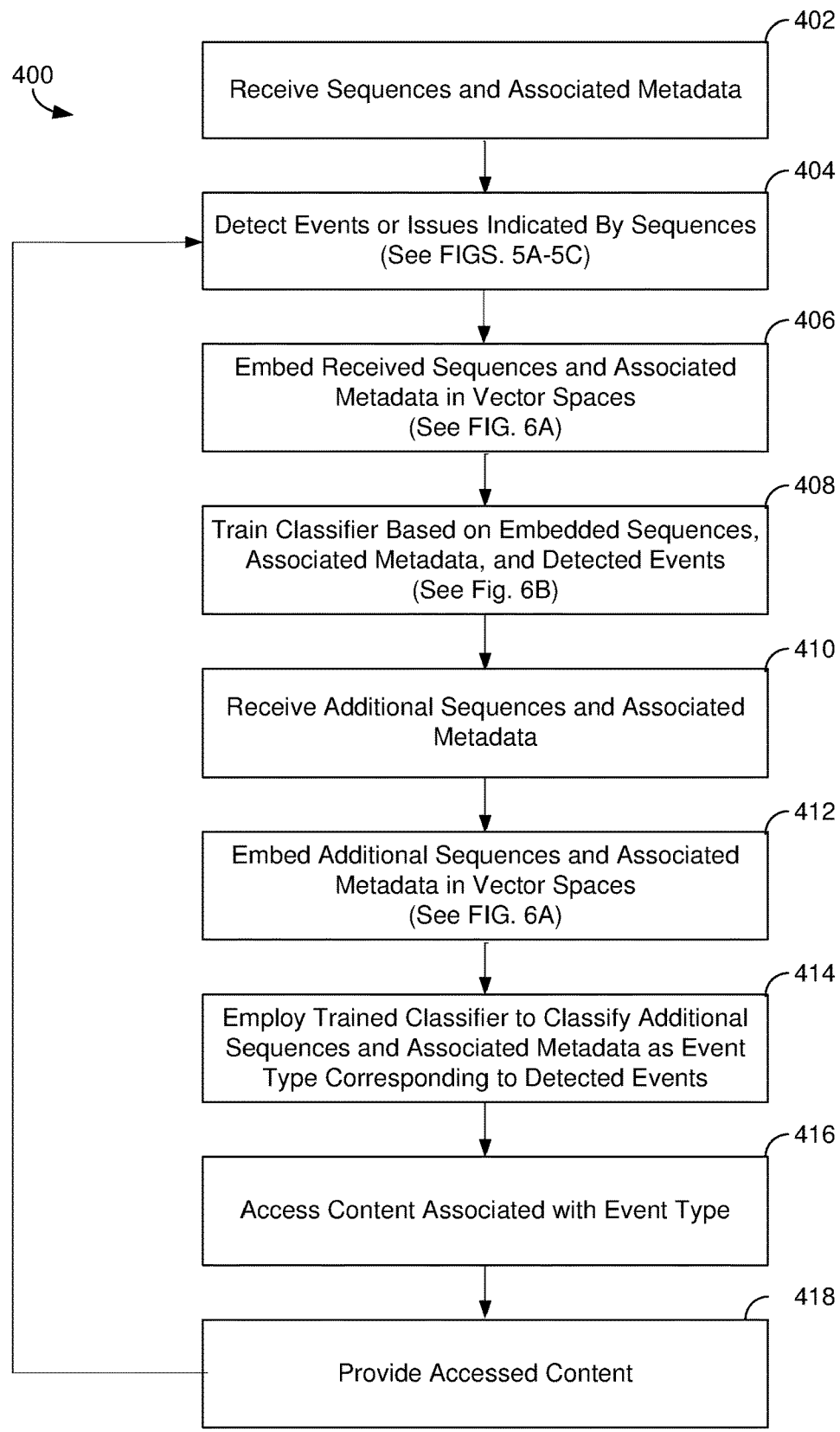
FIG. 4 provides a flow diagram that illustrates a process for providing requested content in accordance with an embodiment of the present disclosure.

Turning now to FIG. 4, a flow diagram is provided that illustrates a process 400 for providing requested content of the present disclosure. At least portions of process 400 may be enabled by, performed by, and/or carried out by devices and/or components included in operating environment 100 of FIG. 1 and/or enhanced system 200 of FIG. 2.

Process 400 begins at block 402, where a plurality of sequences and associated metadata are received. For example, sequence stream aggregator 212 of FIG. 2 may receive, access, and/or aggregate a plurality of sequences and associated metadata via a sequence stream. At block 404, a plurality of events and/or issues may be detected and/or identified. Various embodiments of detecting events or issues, indicated by the received sequences, are discussed in conjunction with at least event detector 260 and/or FIGS. 5A-5C.

At block 406, the received sequences and associated metadata are embedded in vector spaces. Various embodiments of embedding the sequences and metadata in vector spaces are discussed in conjunction with at least sequence and metadata embedder 288 and/or FIG. 6A. At block 408, a classifier, such as but not limited to sequence classifier 280, is trained based on the embedded sequences, embedded metadata, and detected events. Various embodiments of training a classifier are discussed in conjunction with classifier-training engine 270, classifier 286, and FIG. 6B. At block 410, additional sequences and associated metadata are received. However, briefly here, supervised machine learning may be employed to train a deep learning neural network to classify the sequences. At block 412, the additionally received sequences and associated metadata are embedded in the vector spaces, as discussed in conjunction with block 406.

At block 414, the trained classifier is employed to classifier the embedded additional sequences and metadata, as one of the detected event and/or issue types. At block 416, content that is mapped to the event or issue type is accessed and/or retrieved. At block 418, the retrieved content is provided to a user and/or computing device that is associated with the classified sequence. For example, UI 350 is FIG. 3B may provide the accessed content.

Figure 5A:
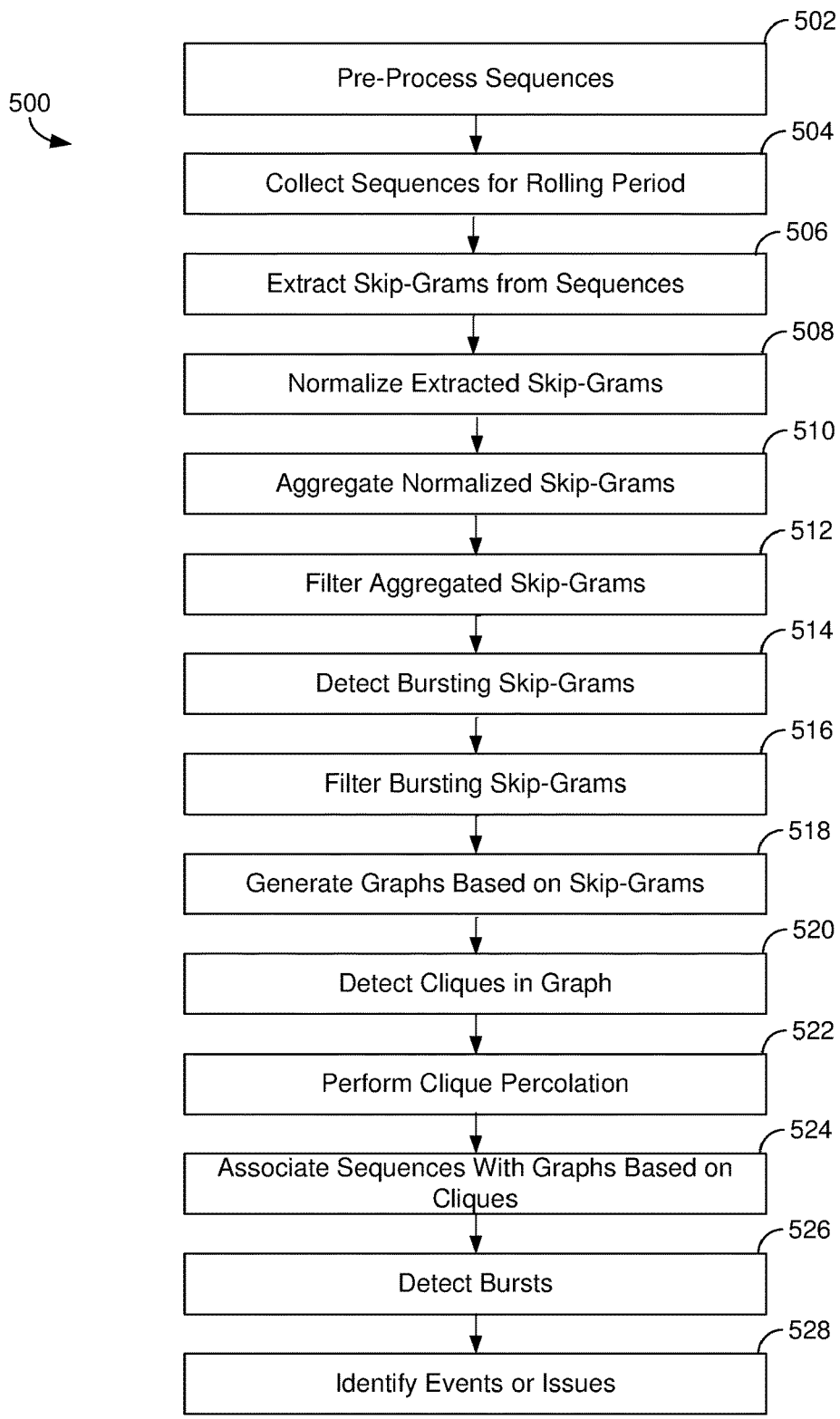
FIG. 5A provides a flow diagram that illustrates a process for detecting and/or identifying events or issues in accordance with an embodiment of the present disclosure.

Turning now to FIG. 5A, a flow diagram is provided that illustrates a process 500 for detecting and/or identifying events or issues of the present disclosure. At least portions of process 500 may be carried out by event detector 260 and/or be discussed in conjunction with event detector 260. Process 500 begins, at block 502, where the received sequences are pre-processed. In various embodiments, pre-processing a sequence may include cleaning and tokenizing the sequence For example, pre-processing can include stop-word removal, lower-casing, and lemmatization of a NL phrase. At block 502, sequence may be collected and preprocessed for a rolling period of time such as a one month rolling feedback period.

At block 506, for each received sequence, unique k-skip-n-grams are extracted from the sequence. For example, for the input text stream "my outlook program is not working," the extracted k-skip-n-grams may include: (my outlook), (my program), (my is), (my not), (my working)|(outlook program), (outlook is), (outlook not), and (outlook working). To illustrate another example, for the NL phrase "the outlook app is a bad program, won't load," the extracted k-skip-n-grams may include (the outlook), (the app), (the is), (the a), (the bad), (the program), (the won't), (the load), (outlook app), (outlook is), (outlook a), (outlook bad), and (outlook program).

In some embodiments, at block 508, the extract k-skip-n-grams may be normalized. At block 510, the normalized k-skip-n-grams may be aggregated across the entire set of received sequences. At block 512, the aggregated k-skip-n-grams may be filtered and/or sorted. In one embodiment, the set of k-skip-n-grams may be sorted in alphabetical order such that "outlook program"="program outlook." For example, the k-skip-n-gram "outlook program" may be aggregated, filtered, and/or sorted according to dates and times, e.g., (Jan. 1, 2017, Feb. 4, 2017, 11:58:29, Mar. 4, 2017, May 4, 2017, Aug. 4, 2017), IDs=(21201, 20201, 29305, 20394, 29395).

At block 514, bursting k-skip-n-gram, across all unique k-skip-n-grams, are detected by applying a finite-state or infinite-state automaton for detecting bursts. One example is Kleinberg's Burst Detection Algorithm. A burst detection algorithm may identify time periods during which an event of interest is uncharacteristically frequent, or "bursty." The algorithm may be applied over the times at which the feedback has occurred to find the Burst Level (BL), Burst Start Time (BST) and the Burst End Time (BET) of each k-skip-n-gram.

At block 516, the set of all the bursting k-skip-n-grams may be identified and/or filtered. For example, at block 516, the set of all k-skip-n-grams that are currently bursting (BET=Current Time, BL>=1) and that started within the past n days (BST>CurrDate−n days) are identified. In one implementation, this set may be named BurstySkipgrams. n may be a parameter that can be tuned to disregard skipgrams that are likely irrelevant/noise because of the length of time required to become "bursty."

At block 518, from the set of BurstySkipgrams, a graph is generated, where pairs of vertices (or nodes) connected by an edge represents one of the bursty k-skip-skip-grams. FIG. 3A shows a non-limiting embodiment of such a generated graph 310. At block 520, cliques in the graph are detected and/or identified. In some embodiments, at block 520, constrained z-cliques are identified across the graph. In one implementation, z=3. Cliques, or subsets or subgraphs of vertices that are adjacent to each other, may be eliminated where the edges have a range of BST more than x amount of time to obtain the set of cliques S1.

At block 522, clique percolation of the set S1 is performed. Two z-cliques may be considered adjacent if they share z−1 nodes AND the range of the BST of the combined set of edges is less than p amount of time to obtain the set of constrained clique communities S2. At block 524, sequences are associated with a graph based on the cliques. In some embodiments, associated a sequence with a clique may be employed as a label for generating training data. At block 524, and for each community in the set of S2, finding the set of all sequences (e.g., items of feedback) that have at least all the words in at least one clique of the community. The result is the set of related feedback for that clique. This operation may be performed across all cliques in the community to find the set of all community feedback. This set of community feedback may be referred to as S3.

At block 526, bursts are detected. For each set of community feedback in S3, a finite-state or infinite-state automaton such as Kleinberg's Burst Detection Algorithm, may be applied, over the times at which the feedback has occurred. The BL, BST and BET of each community may be determined. In one embodiment, a different set of parameters for the burst detection algorithm such as S, Lambda, Lambda2 can be employed at this stage than previously used to apply more stringent requirements for community burst detection.

At block 528, events or issues are identified. For each community that is currently bursting (BET=Current Time, BL>=1), identifying overlapping cliques with bursty communities from the previous iteration. If there is overlap, then the clique is determined to be the same issue. Otherwise, a new issue is identified.

Figure 5B:
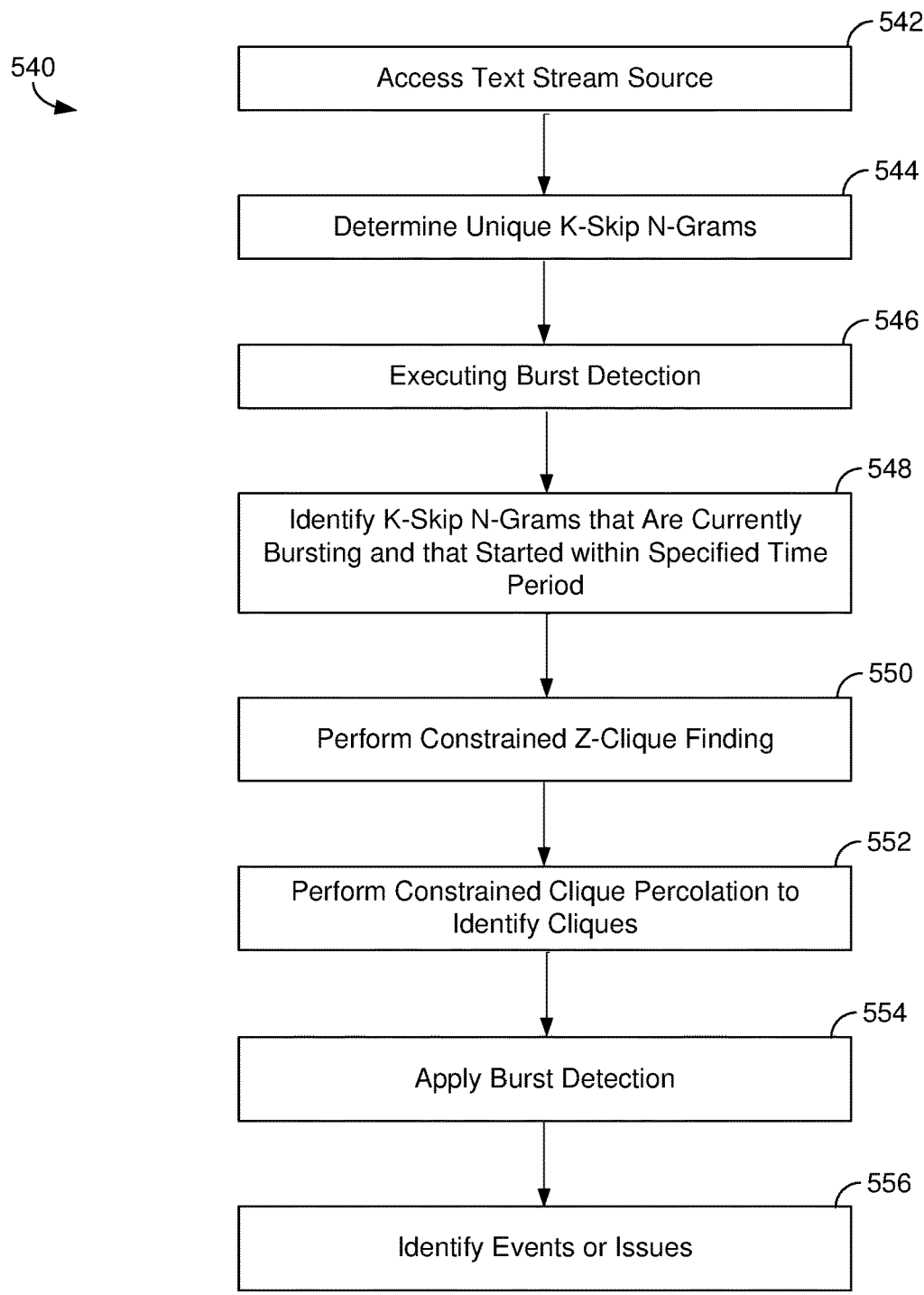
FIG. 5B provides a flow diagram that illustrates another process for detecting and/or identifying events or issues in accordance with an embodiment of the present disclosure.

Turning now to FIG. 5B, a flow diagram is provided that illustrates another process 540 for detecting and/or identifying events or issues of the present disclosure. At least portions of process 540 may be carried out by event detector 260 and/or be discussed in conjunction with event detector 260. Process 540 is directed to an embodiment where the sequences includes NL phrases within a text stream. Process 540 begins, at block 542, where the received sequences are retrieved to access the NL phrases within the test stream source.

At block 542, a text stream source comprising a plurality of entries is accessed. In some embodiments, the plurality of entries pertains to a computing product or service.

At block 544, for the plurality of entries, unique k-skip-n-grams are determined. In some embodiments, the determined unique k-skip-n-grams are aggregated. In some embodiments, n=2 for the k-skip-n-grams.

At block 546, a burst detection algorithm is executed to determine a burst level, burst start time, and burst end time of the k-skip-n-grams. In some embodiments, the burst detection algorithm is Kleinberg's Burst Detection Algorithm.

At block 548, based on the burst level, burst start time, and burst end time, k-skip-n-grams that are currently bursting and that started within a specified time period are identified. In some embodiments, the specified time period comprises a dynamic monitoring period.

At block 550, constrained z-clique finding on a graph of the identified k-skip-n-grams is performed. In some embodiments, the graph comprises pairs of vertices connected by an edge that represents one of the k-skip-n-gram. In some embodiments, the constrained z-clique is performed with z=3.

At block 552, constrained clique percolation on the graph is performed and cliques are identified. More particularly, cliques that have a set of texts with all the words are included are identified. At block 554, the burst detection algorithm is applied over times which correspond to the time that the sequences were generated and/or sent.

At block 556, based on determined burst detections, an issue or event where there is no overlap of cliques is identified. In some embodiments, the issue comprises a potential service issue with the computing product or service. In some embodiments, cliques are eliminated where edges on the graph have a range of burst start time more than a predetermined amount of time.

Figure 5C:
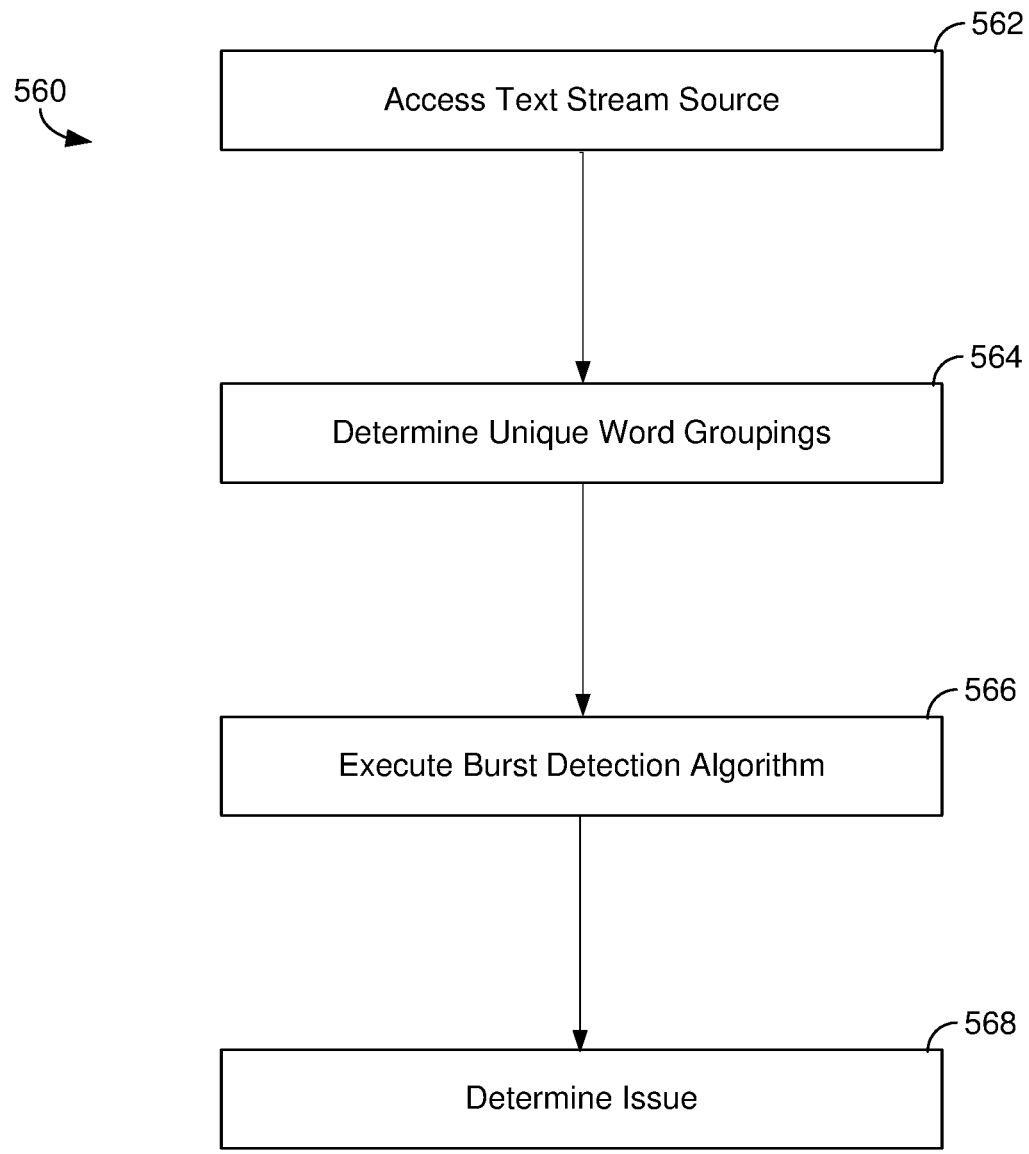
FIG. 5C provides a flow diagram that illustrates still another process for detecting and/or identifying events or issues in accordance with an embodiment of the present disclosure.

Turning now to FIG. 5C, a flow diagram is provided that illustrates still another process 560 for detecting and/or identifying events or issues of the present disclosure. At least portions of process 560 may be carried out by event detector 260 and/or be discussed in conjunction with event detector 260. Process 560 is directed to an embodiment where the sequences includes NL phrases within a text stream. At block 562, a text stream source comprising a plurality of text content items is accessed. At block 564, for the plurality of text content items, unique word groupings are determined. In an embodiment, the unique word groupings are determined as unique k-skip-n-grams. In an embodiment, unique word groupings are identified that are currently bursting and that started within a specified time period.

At block 566, a burst detection algorithm is executed to determine word groupings that are currently bursting and that started within a specified time period. In an embodiment, constrained z-clique is performed finding for graphs where pairs of vertices connected by an edge represents one of the unique word groupings. In an embodiment, constrained clique percolation across graphs is performed.

At block 568, based on the word groupings, an issue based on identifying a set of texts forming at least one clique is determined. In an embodiment, determining the issue comprises finding a set of texts that have at least all words therein in at least one clique and applying the burst detection algorithm over times at which feedback has occurred.

Figure 6A:
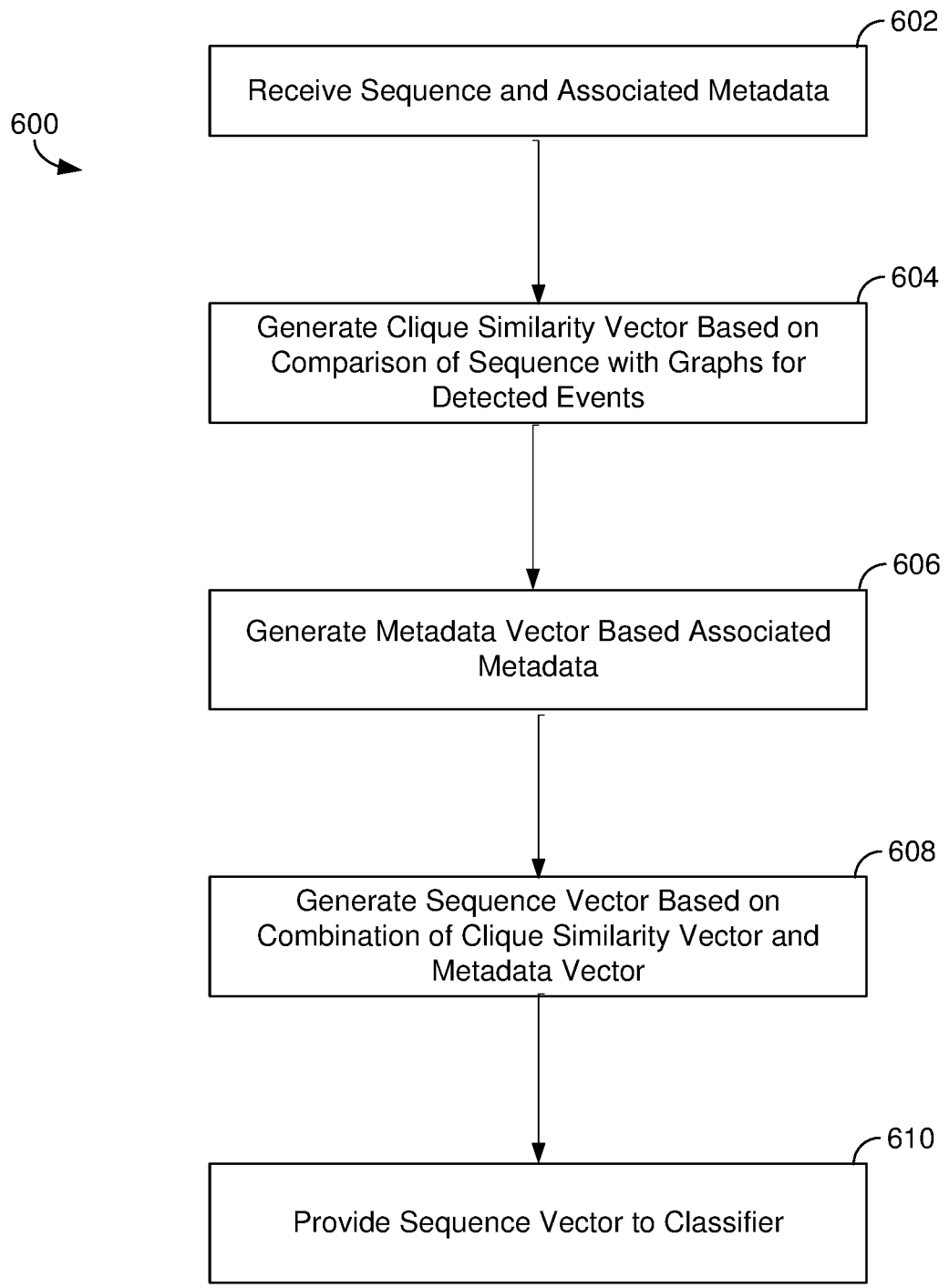
FIG. 6A a flow diagram is provided that illustrates a process for embedding sequences of objects and associated metadata in a vector space in accordance with an embodiment of the present disclosure.

Turning now to FIG. 6A, a flow diagram is provided that illustrates a process 600 for embedding sequences of objects and associated metadata in a vector space of the present disclosure. At least portions of process 600 may be enabled by, performed by, and/or carried out by devices and/or components included in operating environment 100 of FIG. 1 and/or enhanced system 200 of FIG. 2. For example, a sequence classifier and/or a sequence metadata embedder may perform portions of process 600.

Process 600 begins, at block 602, where a sequence of objects and associated metadata are received. For example, sequence classifier 280 may receive a sequence that include a plurality of NL tokens, and metadata associated with the sequence. At block 604, a clique similarity vector is generated based on a comparison of the sequence with graphs for various detected events. At block 606, a metadata vector is generated based on the associated metadata.

At block 608, a sequence vector is generated based on a combination of the clique similarity vector and the metadata vector. In at least one embodiment, the sequence vector is a concatenation of the clique similarity vector and the metadata vector. At block 610, sequence vector is provided to a classifier, such as but not limited to classifier 286 of FIG. 2.

Figure 6B:
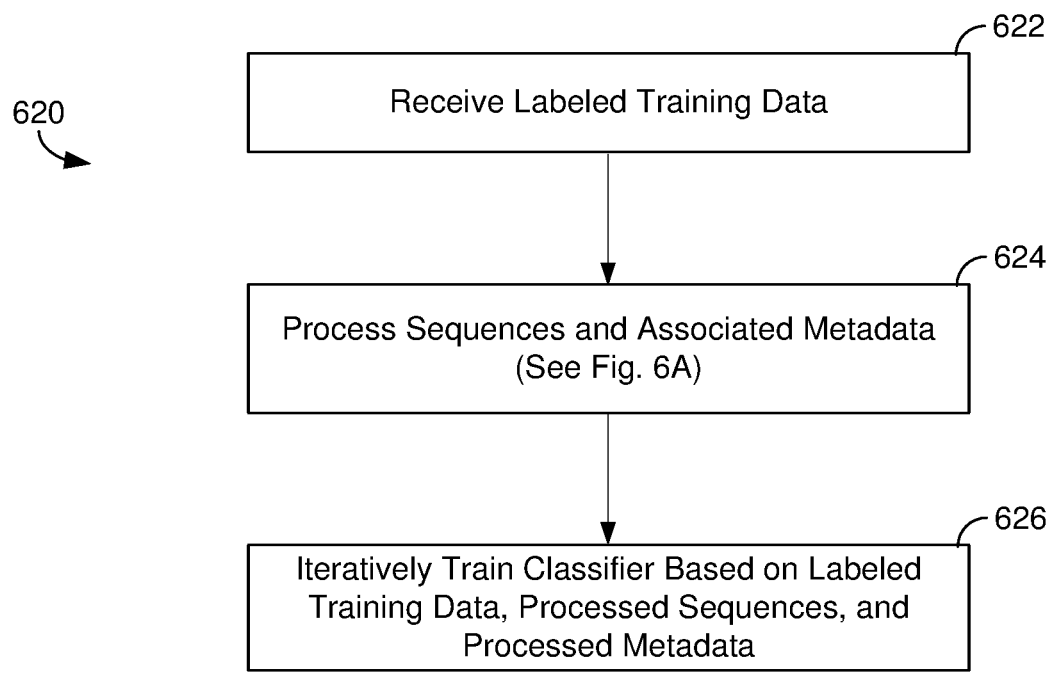
FIG. 6B a flow diagram is provided that illustrates a process for training a classifier in accordance with an embodiment of the present disclosure.

Turning now to FIG. 6B, a flow diagram is provided that illustrates a process 620 for training a classifier of the present disclosure. At least portions of process 620 may be enabled by, performed by, and/or carried out by devices and/or components included in operating environment 100 of FIG. 1 and/or enhanced system 200 of FIG. 2. For example, classifier-training engine 270 and sequence classifier 280 may employ portions of process 620 to train classifier 286.

Process 620 begins, at block 622, where labeled training data is received. The labeled training data may include a plurality of received sequences and a label indicating an event or issue for each of the plurality of sequences based on the sequence being associated with the labeled event or issue. The sequence may be associated with the event or issue during a process of analyzing the sequences to detect and/or identify the event or issue. At block 624, the received sequences and associated metadata are processed. Processing the sequences and associated metadata may include embedding the sequences and metadata into vector spaces. Various embodiments of embedding sequences and metadata in vector spaces are discussed in conjunction with at least process 600 of FIG. 6A. At block 626, a classifier is iteratively trained based on the labeled training data, the processed sequences, and the processed metadata. In some embodiments, classifier-training engine 270 may employ supervised machine learning methods and the labeled training data to train a classifier model implemented by classifier 286, to classify the sequences as an event or issue, based on the processed sequences and metadata. In some embodiments, classifier 286 may implement the classifier model via a classifier neural network that includes at least two hidden layers. A loss function, backpropagation, and stochastic gradient descent may be employed to train the classifier.

Figure 7:
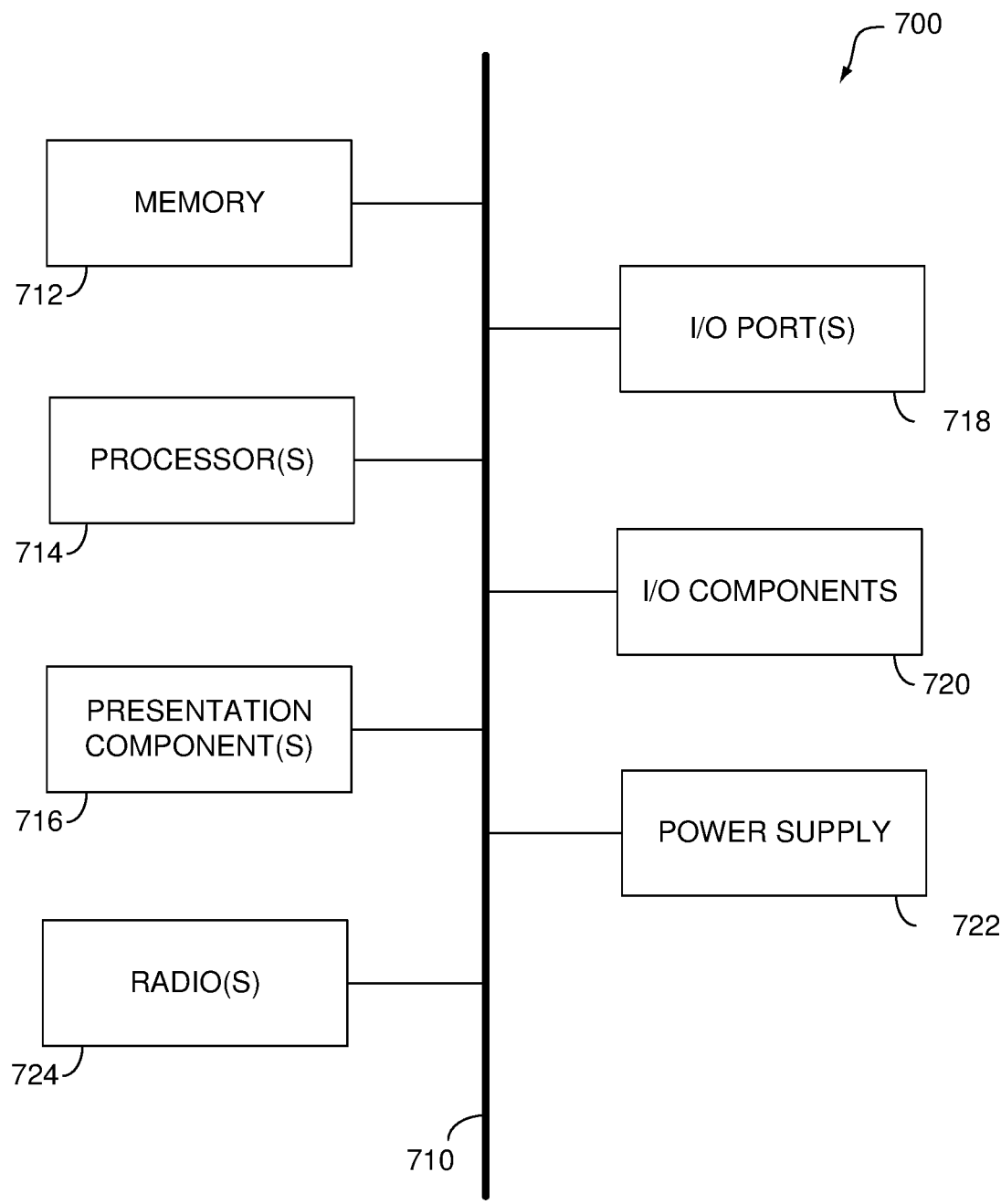
FIG. 7 is a block diagram of an exemplary computing environment suitable for use in implementing an embodiment of the present disclosure.

Having described various implementations, an exemplary computing environment suitable for implementing embodiments of the disclosure is now described. With reference to FIG. 7, an exemplary computing device is provided and referred to generally as computing device 700. The computing device 700 is but one example of a suitable computing environment and is not intended to suggest any limitation as to the scope of use or functionality of embodiments of the disclosure. Neither should the computing device 700 be interpreted as having any dependency or requirement relating to any one or combination of components illustrated.

Embodiments of the disclosure may be described in the general context of computer code or machine-usable instructions, including computer-usable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more embodiments of the present disclosure. Distinction is not made between such categories as "workstation,"

"server," "laptop," "handheld device," etc., as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 presents data indications to a user or other device. In some implementations, presentation component 220 of system 200 may be embodied as a presentation component 716. Other examples of presentation components may include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some embodiments of computing device 700 may include one or more radio(s) 724 (or similar wireless communication components). The radio 724 transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computerized system comprising:
    a processor; and
    computer storage memory having computer-executable instructions stored thereon which, when executed by the processor, perform functions of:
        receiving a plurality of sequences, wherein each of the plurality of sequences includes a plurality of objects, each object including at least one selected from a group comprised of user requests for online help or assistance; and user feedback pertaining to online help or assistance;
        detecting a plurality of events associated with the user requests or user feedback based on analyzing k-skip-n-grams included in the plurality of sequences, wherein for each event of the detected plurality of events, a graph is generated that includes z-cliques that correspond to portions of the k-skip-n-grams that are included in the plurality of sequences;

receiving a first sequence of objects, including a first user request or first user feedback, that is separate from the plurality of objects, wherein the first sequence of objects includes a first plurality of k-skip-n-grams;

employing a trained classifier to classify the first sequence of objects, including the first user request or first user feedback, as being associated with a first event of the detected plurality of events, wherein classifying the first sequence of objects is based on a comparison between the first plurality of k-skip-n-grams and the z-cliques of the graph generated for the first event;

receiving metadata associated with the first sequence of objects;

encoding the comparison between the first plurality of k-skip-n-grams and the z-cliques of the graph in a first vector;

encoding the metadata associated with the first sequence of objects in a second vector;

generating an input vector based on a concatenation of the first and the second vectors; and employing the input vector and the trained classifier to classify the first sequence of objects as being associated with the first event.

2. The system of claim 1, wherein the computer-executable instructions, when executed by the processor, perform further functions comprising:

accessing tutorial content that is associated with the first event; and providing the tutorial content to a computing device that provided the first sequence of objects.

3. The system of claim 1, wherein the computer-executable instructions, when executed by the processor, perform further functions comprising:

generating a labeled training dataset that includes the plurality of sequences and a label indicating one of the detected plurality of events for each of the plurality of sequences; and employing supervised machine learning and the labeled training dataset to train the classifier to classify each of the plurality of sequences as the event indicated by a corresponding label.

4. The system of claim 1, wherein the trained classifier is implemented by a neural network with at least two hidden layers.

5. The system of claim 1, wherein the plurality of sequences includes a plurality of natural language (NL) phrases, and each of the plurality of NL phrases indicates a request for information associated with one of the detected plurality of events.

6. A computerized system comprising:
a processor; and
computer storage memory having computer-executable instructions stored thereon which, when executed by the processor, perform functions of:

receiving a plurality of sequences, wherein each of the plurality of sequences includes a plurality of objects, each object including at least one selected from a group comprised of user requests for online help or assistance; and user feedback pertaining to online help or assistance;

detecting a plurality of events associated with the user requests or user feedback based on analyzing k-skip-n-grams included in the plurality of sequences, wherein for each event of the detected plurality of events, a graph is generated that includes z-cliques that correspond to portions of the k-skip-n-grams that are included in the plurality of sequences;

receiving a first sequence of objects, including a first user request or first user feedback, that is separate from the plurality of objects, wherein the first sequence of objects includes a first plurality of k-skip-n-grams; and employing a trained classifier to classify the first sequence of objects, including the first user request or first user feedback, as being associated with a first event of the detected plurality of events, wherein classifying the first sequence of objects is based on a comparison between the first plurality of k-skip-n-grams and the z-cliques of the graph generated for the first event, wherein detecting the plurality of events includes:

executing a burst detection algorithm to determine at least one of a burst level, burst start time, and burst end time of the k-skip-n-grams;

based on the at least one of the burst level, burst start time, and burst end time, identifying k-skip-n-grams that are currently bursting and that started within a specified time period;

performing constrained z-clique finding on the graph of the identified k-skip-n-grams;

performing constrained clique percolation on the graph;

identifying cliques where a set of sequences have all objects included therein;

applying the burst detection algorithm over times at which plurality of sequences has occurred; and based on determined burst detections, detecting the plurality of events, wherein there is no overlap of cliques of the plurality of events.

7. The system of claim 6, wherein executing the burst detection algorithm includes determining each of the burst level, burst start time, and burst end time of the k-skip-n-grams.

8. A method comprising:

receiving a plurality of sequences, wherein each of the plurality of sequences includes a sequence of objects;

detecting a plurality of events based on analyzing k-skip-n-grams included in the plurality of sequences, wherein for each event of the detected plurality of events, a graph is generated that includes z-cliques that correspond to portions of the k-skip-n-grams that are included in the plurality of sequences;

receiving a first sequence of objects that is separate from the plurality of objects, wherein the first sequence of objects includes a first plurality of k-skip-n-grams;

employing a trained classifier to classify the first sequence of objects as being associated with a first event of the detected plurality of events, wherein classifying the first sequence of objects is based on a comparison between the first plurality of k-skip-n-grams and the z-cliques of the graph generated for the first event;

receiving metadata associated with the first sequence of objects;

encoding the comparison between the first plurality of k-skip-n-grams and the z-cliques of the graph in a first vector;

encoding the metadata associated with the first sequence of objects in a second vector;

generating an input vector based on a concatenation of the first and the second vectors; and employing the input vector and the trained classifier to classify the first sequence of objects as being associated with the first event.

9. The method of claim 8, wherein the method further comprises:
   accessing tutorial content that is associated with the first event; and
   providing the tutorial content to a computing device that provided the first sequence of objects.

10. The method of claim 8, further comprising:
    generating a labeled training dataset that includes the plurality of sequences and a label indicating one of the detected plurality of events for each of the plurality of sequences; and
    employing supervised machine learning and the labeled training dataset to train the classifier to classify each of the plurality of sequences as the event indicated by a corresponding label.

11. The method of claim 8, wherein the trained classifier is implemented by a neural network with at least two hidden layers.

12. The method of claim 8, wherein detecting the plurality of events includes:
    executing a burst detection algorithm to determine a burst level, burst start time, and burst end time of the k-skip-n-grams;
    based on the burst level, burst start time, and burst end time, identifying k-skip-n-grams that are currently bursting and that started within a specified time period;
    performing constrained z-clique finding on the graph of the identified k-skip-n-grams;
    performing constrained clique percolation on the graph;
    identifying cliques where a set of sequences have all objects included therein;
    applying the burst detection algorithm over times at which plurality of sequences has occurred; and
    based on determined burst detections, detecting the plurality of events, wherein there is no overlap of cliques of the plurality of events.

13. The method of claim 8, wherein the plurality of sequences includes a plurality of natural language (NL) phrases, and each of the plurality of NL phrases indicates a request for information associated with one of the detected plurality of events.

14. A non-transitory computer-readable media having instructions stored thereon, wherein the instructions, when executed by a processor of a computing device, cause the computing device to perform actions including:
    receiving a plurality of sequences, wherein each of the plurality of sequences includes a plurality of objects, each object including at least one selected from a group comprised of: user requests for online help or assistance; and user feedback pertaining to online help or assistance;
    detecting a plurality of events associated with the user requests or user feedback based on analyzing k-skip-n-grams included in the plurality of sequences, wherein for each event of the detected plurality of events, a graph is generated that includes z-cliques that correspond to portions of the k-skip-n-grams that are included in the plurality of sequences;
    receiving a first sequence of objects, including a first user request or first user feedback, that is separate from the plurality of objects, wherein the first sequence of objects includes a first plurality of k-skip-n-grams;
    employing a trained classifier to classify the first sequence of objects, including the first user request or first user feedback, as being associated with a first event of the detected plurality of events, wherein classifying the first sequence of objects is based on a comparison between the first plurality of k-skip-n-grams and the z-cliques of the graph generated for the first event;
    receiving metadata associated with the first sequence of objects;
    encoding the comparison between the first plurality of k-skip-n-grams and the z-cliques of the graph in a first vector;
    encoding the metadata associated with the first sequence of objects in a second vector;
    generating an input vector based on a concatenation of the first and the second vectors; and
    employing the input vector and the trained classifier to classify the first sequence of objects as being associated with the first event.

15. The computer-readable media of claim 14, the actions further comprising:
    accessing tutorial content that is associated with the first event; and
    providing the tutorial content to a computing device that provided the first sequence of objects.

16. The computer-readable media of claim 14, the actions further comprising:
    generating a labeled training dataset that includes the plurality of sequences and a label indicating one of the detected plurality of events for each of the plurality of sequences; and
    employing supervised machine learning and the labeled training dataset to train the classifier to classify each of the plurality of sequences as the event indicated by the corresponding label.

17. The computer-readable media of claim 14, wherein the trained classifier is implemented by a neural network with at least two hidden layers.

18. A non-transitory computer-readable media having instructions stored thereon, wherein the instructions, when executed by a processor of a computing device, cause the computing device to perform actions including:
    receiving a plurality of sequences, wherein each of the plurality of sequences includes a plurality of objects, each object including at least one selected from a group comprised of: user requests for online help or assistance; and user feedback pertaining to online help or assistance;
    detecting a plurality of events associated with the user requests or user feedback based on analyzing k-skip-n-grams included in the plurality of sequences, wherein for each event of the detected plurality of events, a graph is generated that includes z-cliques that correspond to portions of the k-skip-n-grams that are included in the plurality of sequences;
    receiving a first sequence of objects, including a first user request or first user feedback, that is separate from the plurality of objects, wherein the first sequence of objects includes a first plurality of k-skip-n-grams;
    employing a trained classifier to classify the first sequence of objects, including the first user request or first user feedback, as being associated with a first event of the detected plurality of events, wherein classifying the first sequence of objects is based on a comparison between the first plurality of k-skip-n-grams and the z-cliques of the graph generated for the first event;
    executing a burst detection algorithm to determine at least one of a burst level, burst start time, and burst end time of the k-skip-n-grams;

based on the at least one of the burst level, burst start time, and burst end time, identifying k-skip-n-grams that are currently bursting and that started within a specified time period;

performing constrained z-clique finding on the graph of the identified k-skip-n-grams;

performing constrained clique percolation on the graph;

identifying cliques where a set of sequences have all objects included therein;

applying the burst detection algorithm over times at which plurality of sequences has occurred; and based on determined burst detections, detecting the plurality of events, wherein there is no overlap of cliques of the plurality of events.

19. The computer-readable media of claim 18, wherein executing the burst detection algorithm includes determining each of the burst level, burst start time, and burst end time of the k-skip-n-grams.

* * * * *